(12) United States Patent
Takeyari et al.

(10) Patent No.: US 7,331,230 B2
(45) Date of Patent: Feb. 19, 2008

(54) SEMICONDUCTOR-TYPE THREE-AXIS ACCELERATION SENSOR

(75) Inventors: Tokuhisa Takeyari, Fukaya (JP); Yoshio Ikeda, Oyama (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 10/580,242

(22) PCT Filed: Dec. 24, 2004

(86) PCT No.: PCT/JP2004/019326

§ 371 (c)(1),
(2), (4) Date: May 22, 2006

(87) PCT Pub. No.: WO2005/062060

PCT Pub. Date: Jul. 7, 2005

(65) Prior Publication Data

US 2007/0089514 A1    Apr. 26, 2007

(30) Foreign Application Priority Data

Dec. 24, 2003   (JP)   ............... 2003-427871
Dec. 13, 2004   (JP)   ............... 2004-359890

(51) Int. Cl.
*G01P 15/12*   (2006.01)

(52) U.S. Cl. .................................. 73/514.33

(58) Field of Classification Search ............. 73/514.33; 338/2

See application file for complete search history.

(56) References Cited

U.S. PATENT DOCUMENTS 5,412,986 A    5/1995   Beringhause et al.
5,507,182 A    4/1996   Yamada et al.
5,635,629 A    6/1997   Imai et al.
6,763,719 B2 *  7/2004   Hatano et al. ........... 73/514.33
2003/0150269 A1  8/2003  Saitoh

FOREIGN PATENT DOCUMENTS

| EP | 1 335 206 A2 | 8/2003 |
|---|---|---|
| JP | 64-018063 | 1/1989 |
| JP | 04-062976 | 2/1992 |
| JP | 04-274005 | 9/1992 |
| JP | 04-279868 | 10/1992 |
| JP | 4-301770 | 10/1992 |

(Continued)

*Primary Examiner*—John E. Chapman
(74) *Attorney, Agent, or Firm*—Sughrue Mion, PLLC

(57) ABSTRACT

There is provided a semiconductor-type three-axis acceleration sensor having a high shock resistance, a small difference between outputs of piezo resistors of X-axis, Y-axis and Z-axis, a small size, high sensitivity and a high output. A flexible arm is composed of flexible widening parts and a flexible parallel part. The flexible widening part has a maximum stress part. The piezo resistors are arranged on an upper surface of the flexible arm so that a terminal of the piezo resistor is positioned at the maximum stress part. The Z-axis piezo resistors are positioned close to the width centerline of the flexible arm, while the X-axis and Y-axis piezo resistors are apart from the width centerline. Moreover, the Z-axis piezo resistors are shifted in the longitudinal direction of the flexible arm from the maximum stress part so as to reduce the output difference between the X-axis, Y-axis and Z-axis piezo resistors.

13 Claims, 18 Drawing Sheets

FOREIGN PATENT DOCUMENTS

| | | |
|---|---|---|
| JP | 6-294813 | 10/1994 |
| JP | 8-29446 | 2/1996 |
| JP | 2002-296293 A | 10/2002 |
| JP | 2003-156509 A | 5/2003 |
| JP | 2003-232803 | 8/2003 |
| JP | 2003-279592 A | 10/2003 |
| JP | 2004-18081 A | 7/2004 |

* cited by examiner

DISTANCE ($\mu$m) FROM WIDTH CENTERLINE

SEMICONDUCTOR-TYPE THREE-AXIS ACCELERATION SENSOR

TECHNICAL FIELD

The present invention relates to a semiconductor-type three-axis acceleration sensor for use in automobiles, aircraft, consumer electronic products, gaming machines, robots, security systems and the like.

BACKGROUND ART

The structure of a piezo resistor-type three-axis acceleration sensor will be described below. FIG. 14 shows an exploded perspective view of a conventional acceleration sensor stated in Patent Document 1: Japanese Laid-open Patent 2004-184081. In an acceleration sensor 1, a sensor element 2 is fixed to a protective case 3 with adhesive. A protective case lid 4 is fixed to the protective case 3 with adhesive. Sensor terminals 6 of the sensor element are connected to the case terminals 7 of the protective case by wires 5. The output of the sensor element 2 is delivered outward through external terminals 8.

The following is a description of a sensor element used in a conventional piezo resistor-type three-axis acceleration sensor. Hereinafter, unless otherwise specified, the same reference characters are used for the same components and portions in order to simplify the description. FIGS. 15A and 15B show a schematic plan view of the sensor element 2 and layout of piezo resistors stated in Patent Document 2: Japanese Laid-open Patent 2003-279592 respectively. In FIG. 15, metal lead wires for connecting between the piezo resistors and sensor terminals thereof and the sensor terminals are omitted for convenience of understanding. The sensor element is composed of a weight 11 formed by a thick part of a silicon single crystal substrate, a support frame 10 so arranged as to surround the weight, two pairs of beam-shaped flexible arms 12, formed by a thin part of the silicon single crystal substrate, orthogonal to each other for connecting the weight 11 to the support frame 10, and the piezo resistors, each provided so as to correspond to the two orthogonal directions (X and Y) on the flexible arm and to the direction (Z) perpendicular to the flexible arm, consisting of X-axis piezo resistors 14, Y-axis piezo resistors 15 and Z-axis piezo resistors 16 in FIG. 15. A through-hole 13 is provided in the thin part of the silicon single crystal substrate so that the flexible arms 12 are in the shape of a beam, thereby the flexible arms 12 are easy to deform and suitable for high sensitivity. Both the X-axis and the Y-axis piezo resistors are the same as each other in output detection principle, connection method and layout, so that they are interchangeable. Hereinafter, unless otherwise specified, the flexible arms extending in the horizontal direction in the figures are taken as X-axis. The piezo resistors provided on the X-axis are referred to as X-axis piezo resistors 14. The Z-axis piezo resistors 16 are regarded as being provided on the same flexible arms as the X-axis piezo resistors 14. FIG. 15B is a partially enlarged view of FIG. 15A.

To increase the acceleration detecting sensitivity (output) of the sensor element, the flexible arms 12 need to be further lengthened, narrowed, and thinned, and the weight 11 needs to be further weighted so that the flexible arms are largely deformed by a slight external force. The terminals of the piezo resistors are aligned with connection ends 17 of the flexible arms being the maximum stress part to effectively take out the quantity of deformation of the flexible arms as the quantity of change in resistance of each axis piezo resistor. The connection ends 17 of the flexible arms are connections between the support frame and flexible arms or between the weight and flexible arms, borders between the flexible arms bent by an external force and the support frame or the weight that is not bent nor moved by the external force, and a position where a maximum stress point occurs on the flexible arm. In most cases, the X-axis piezo resistors 14 and the Z-axis piezo resistors 16 are arranged on the same flexible arm, so that they are symmetrically arranged with respect to the width centerline of the flexible arm, while the Y-axis piezo resistors 15 are arranged on the width centerline. Symmetrical arrangement of the piezo resistors with respect to the width centerline facilitates designing and producing the metal wirings for connecting between the piezo resistors.

An acceleration sensor mounted on mobile devices and the like is required to detect acceleration of several G's. It is important that the sensor element does not break down even if the acceleration sensor is subjected to acceleration of about 3000 G when the mobile device is dropped. It is necessary to resolve a contradiction that an easily-bendable flexible arm is needed to raise the acceleration detection sensitivity of the sensor element, but on the other hand, a less-deformable flexible arm is needed to raise a shock resistance by increasing its mechanical strength.

Patent Document 3: Japanese Laid-open Patent 4-274005 sets forth a configuration for restricting the movement in the Z-axis direction to increase a shock resistance. To realize this, regulating plates 18 and 19 are mounted above and below a sensor element with predetermined gaps of g1 and g2, as shown in a cross-sectional view of FIG. 16. When an acceleration sensor is subjected to shock, a weight 11 contacts regulating plates 18 and 19 to prevent a flexible arm 12 from breaking down before it is deformed to result in breakdown. The movement amount in the Z-axis direction is restricted within the values of g1 and g2. The movement amount in the X-axis and the Y-axis direction is restricted by corners of the weight contacting the regulating plate 19. It is difficult to set an optimum gap g2 because the amount of movement in the X-axis and the Y-axis direction until the corners of the weight 11 contacting the regulating plate 19 is changed, depending on the torsion of the flexible arm, but the regulating plate is effective as a structural element to raise a shock resistance.

Patent Document 4: Japanese Laid-open Patent 2002-296293 describes a structure for restricting the movement of a flexible arm by a part of a weight of a sensor element contacting other parts. FIG. 17 is a perspective view of the sensor element 2 disclosed in Patent Document 4. This structure is basically the same as that of the sensor element previously described in FIG. 15. A weight 11 is provided with petal-shaped auxiliary weights 22. When the sensor element is subjected to shock in the X-axis or the Y-axis direction, sides of the auxiliary weights 22 contact side walls of a support frame 10 to prevent flexible arms 12 from breaking down before they are deformed to result in breakdown. Addition of the auxiliary weights 22 increases the mass of the weight as a whole, so that this structure is effective to raise an acceleration detection sensitivity (output) of the sensor element, but the flexible arm liable to break down according to the mass increasing. In particular, it is difficult to stop an excessive movement in the Z-axis direction only by adding the auxiliary weights 22, which needs using a regulating plate as disclosed in Patent Document 3 as well.

The structures for improving the shock resistance disclosed in Patent Documents 3 and 4 are not intended to increase mechanical strength of the flexible arm. Patent Document 5: Japanese Laid-open Patent 64-18063 sets forth a structure in which a bend is provided at a connection between a flexible arm 12 and a support frame 10 or between the flexible arm 12 and a weight 11. FIG. 18A, FIG. 18B and FIG. 18C show a plan view, a cross-sectional perspective view taken on the line 18B-18B of FIG. 18A, and a plan view of another embodiment, respectively. FIGS. 18A and 18B show a structure in which a bend 24 is provided in the thickness direction of the flexible arm 12. FIG. 18C shows a structure in which a bend 25 is provided in the plane direction of the flexible arm 12. The provision of the bends 24 and 25 disperses stress applied to the bends uniformly to the whole bends and increases the mechanical strength of the flexible arm 12. In FIG. 18, strain gauges 23 are used to detect stress. Nothing has been mentioned about a relationship in position between the strain gauges 23 and the bends 24 and 25.

Patent Document 6: Japanese Laid-open Patent 8-29446 sets forth an acceleration sensor, which has bends (shape changing parts 26) provided in the plane direction of a flexible arm as in the case with Patent Document 5, and in which a positional relationship with a piezo resistor is clarified. FIG. 19A is a plan view of the acceleration sensor, and FIG. 19B is a cross section taken on the line 19B-19B of FIG. 19A. Connection of the flexible arm 12 supporting a weight 11 to a support frame 10 through the shape changing part 26 causes a maximum stress part to occur on a border between the flexible arm 12 and the shape changing part 26. On the border is located a piezo resistor 27. The shape changing parts intervening between the flexible arm and the support frame reduce stress on the border between the support frame and the shape changing parts, improving shock resistance. Judging from the existence of the maximum stress part on the border between the flexible arm 12 and the shape changing parts 26, the shape changing parts are treated as parts that are not bent and do not move even if they are subjected to an external force. In Patent Document 2, a bending part is the flexible arms, and an unbending part is the support frame, while, in Patent Document 6, a bending part is the flexible arm and an unbending part is the shape changing parts and the support frame, so that it is apparent that the positions of the maximum stress part and layout of the piezo resistor are the same for the Documents.

The above is a description of the structures of the acceleration sensors of which shock resistances are improved, disclosed in the prior technical documents. However, these structures have some drawbacks and advantages as measures for improving shock resistances. The structure, in which the regulating plates are provided as described in Patent Document 3, requires adding the regulating plates as components and accurately assembling the plates. Addition of the regulating plates makes it difficult to thin the acceleration sensor. It is easily understandable from Patent Document 4 that it is difficult to accurately produce a slight space between the auxiliary weight and the support frame in using a silicon substrate that is as thick as the weight. In the structure of Patent Document 6, the piezo resistor is provided on the maximum stress part to maximize the output. However, the shape changing parts are taken as an unbending part, which should substantially shorten the length of the flexible arm if the outer dimension of the sensor element and the width of the support frame are unchanged, result in decreasing the absolute value of output. Enhancement of the absolute value of the output needs increasing the outer dimension of the sensor element, which makes it difficult to downsize.

In a three-axis acceleration sensor, it is necessary to balance output of each axis. A great difference between outputs of the axes needs preparing an amplifier different in amplification factor for each axis, which increases cost. Moreover this widens circuit area and may impede downsizing. In particular, difference between outputs of the X-axis (Y-axis) and the Z-axis remains a major problem. FIG. 20 is a graph showing a relationship between a weight thickness and outputs of X-axis and Y-axis. The Z-axis varies according to a linear function with respect to the thickness of a weight. The X-axis varies according to a quadratic function with respect to the thickness of the weight. The outputs of the X-axis and the Y-axis approximately equal to each other at a thickness of about 800 μm. The prevailing silicon single crystal substrate used in semiconductor manufacturing is 625 μm or less in thickness, but an about 800-μm thick substrate is disadvantageous in price and delivery. It is inevitable that the sensor element will be thinned. Thinning further enlarges the difference between outputs of the X-axis and the Y-axis.

DISCLOSURE OF THE INVENTION

An object of the present invention is to provide a semiconductor-type three-axis acceleration sensor having a high shock resistance, a small difference between outputs of X-axis, Y-axis and Z-axis, a small size, high sensitivity and a high output.

A semiconductor-type three-axis acceleration sensor according to the present invention comprises:

a weight positioned in a center of the acceleration sensor and being applied to by outside acceleration;

a support frame for supporting the weight;

at least one flexible arm, shaped in a thin beam, connecting an upper surface of the weight and an upper surface of the support frame at two connection ends (hereinafter, each of the connection ends at both ends of the flexible arm may be referred to as "first connection end".) at both ends of the flexible arm between the weight and the support frame;

a plurality of piezo resistors, for measuring each axis-component of three axis-components of the acceleration, disposed on an upper surface of the flexible arm and aligned along the upper surface of the flexible arm in a longitudinal direction of the flexible arm; and lead wires connecting terminals of the plurality of piezo resistors on the upper surface of the flexible arm. And, the flexible arm is composed of a flexible parallel part having connection ends (the connection ends at both ends of the flexible parallel part may be referred to as "second connection ends".) at both ends and a substantially uniform width;

and two flexible widening parts, each connecting one of the second connection ends of the flexible parallel part and the first connection end with the support frame or the weight and widening from the second connection ends of the flexible parallel part toward the first connection ends. Each of the plurality of piezo resistors disposed on the upper surface of the flexible arm is positioned apart from the first connection end of the flexible arm, and each of the plurality of piezo resistors for measuring at least one axis-component of the three axis-components of the acceleration extends from the flexible widening part, across the second connection end and on the flexible parallel part.

In the semiconductor-type three-axis acceleration sensor of the present invention described above, it is desirable that the flexible arm has a maximum stress part of the flexible arm on the flexible widening part, and that each of the plurality of piezo resistors for measuring at least one axis-component of the three axis-components of the acceleration applied from the outside has a terminal of the piezo resistor at the maximum stress part on the flexible widening part and extends from the maximum stress part, across the second connection end and on the flexible parallel part.

In the semiconductor-type three-axis acceleration sensor of the present invention, the upper surface of the weight, the upper surface of the support frame and the upper surface of the flexible arm may be substantially on a plane, and in orthogonal coordinates having X-axis and Y-axis on the plane, Z-axis of the coordinates may be vertical to the plane. Using the coordinates, the three axis-components of the acceleration mean an X-axis direction component (X-axis component), a Y-axis direction component (Y-axis component) and a Z-axis direction component (Z-axis component) of the acceleration applied to an acceleration sensor from the outside.

Specifically, the semiconductor-type three-axis acceleration sensor of the present invention may have two flexible arms extending in the X-axis direction and two flexible arms extending in Y-axis direction from the weight in the center.

In the present invention, the flexible arm shaped in a thin beam is composed of flexible widening parts and a flexible parallel part. Namely, the flexible widening part is part of the flexible arm. In Patent Document 6 discussed above, shape varying parts that correspond to a flexible widening part in the present invention are treated as part of a support frame or a weight. It is understood from the document that the shape varying parts are required to have a structure having a mechanical strength enough not to be bent by an external force, though the dimensions and the shape of the shape varying parts are not described in detail in Patent Document 6. In the present invention, it is desirable that the flexible widening part has such minimum dimensions that the flexible arm is not broken by an external force, since the flexible widening part is part of the flexible arm and should be bent by the external force.

In the conventional sensor element disclosed in Patent Documents 2 and 6, since the maximum stress part occurring when a weight is subjected to an external force lies on the border between an unbending part and a flexible arm, the piezo resistor is located on the flexible arm with a terminal thereof positioned at the end of the flexible arm to obtain the maximum detection sensitivity (output). In a structure in which a flexible arm has flexible widening parts and a flexible parallel part like the present invention, the flexible widening parts have flexibility, so that a maximum stress part occurs within the length of the flexible widening parts. A position (distance from an end of the flexible arm or an end of the flexible parallel part to the maximum stress part) of the maximum stress part occurring within the length of the flexible widening part varies according to a width of a connection end of the flexible arm or a shape of ridges of the flexible arm. Degrees in change in stress between the maximum stress part and the connection end of the flexible arm and between the maximum stress part and the end of the flexible parallel part significantly depend upon the shape of the flexible widening part. For this reason, it is preferable to locate the piezo resistor with a terminal thereof meeting with the maximum stress part. When the piezo resistor is located across the maximum stress part, a part of the resistor might be provided on an upper surface of the support frame or the weight. Even if the flexible arm is deformed by an external force, the piezo resistors located on the upper surface of the support frame and/or the weight cause no change in resistance, resulting in the fluctuation in outputs of the piezo resistors. Alignment of a terminal of the piezo resistor with the maximum stress part decreases the fluctuation of amounts in resistances of the piezo resistors among the axes thereof in a sensor element, facilitating designing the sensor element.

In the sensor element according to the present invention, the maximum stress part is within the length of the flexible widening part, and the piezo resistor is arranged on the upper surface of the flexible arm with a terminal thereof positioned at the maximum stress part, so that both terminals of the piezo resistor are located away from the connection end of the flexible arm on the upper surface of the flexible arm.

It is preferable that the flexible widening parts in the semiconductor-type three-axis acceleration sensor according to the present invention have continuous curved or straight ridges on both side ends of its upper surface, and the ridges on the both side ends be symmetrical to each other with respect to the width centerline of the flexible arm.

The position of the maximum stress part varies, depending on the shape of the flexible widening part. The shape of the flexible widening part is determined by ridges for connecting an end point of the connection end of the flexible arm to that of the connection end of the flexible parallel part. The flexible widening part is subjected to acceleration to be bent, but less bent than the flexible parallel part. Thus, it is preferable to make the length of the flexible widening part as short as possible to assure the length of the flexible arm effectively working, thereby obtaining a high output. It is preferable to increase the width of the connection end of the flexible arm to enhance the strength at the connection end of the flexible arm, which is a contradictory requirement though. In view of the requirement, it is desirable that the flexible widening part has continuous straight or curved ridges on its side ends from the end points of the connection end of the flexible parallel part to those of the connection end of the flexible arm, and the curvature is gentle in the vicinity of the connection end of the flexible parallel part and steep in the vicinity of the connection end of the flexible arm when the ridge is a curve. As a concrete image, it is preferable that the connection end of the flexible arm corresponding to a foot of a mountain be wider and the length of the flexible widening part corresponding to altitude be shorter like a small mountain. Such a shape that the width of the connection end of the flexible arm is kept unchanged until the vicinity of the connection end of a flexible parallel part, like a bell-shaped flexible widening part, is not preferable because the maximum stress part would be close to the connection end of the flexible arm. It is preferable that an angle made by the connection end of the flexible arm and the ridge for connecting the end point of the connection end of the flexible arm to that of the connection end of the flexible parallel part be 45 degrees or smaller.

The flexible widening part may be changed in shape between a side of the support frame and a side of the weight to obtain an optimal shape for each side as long as the shock resistance can be satisfied. However, the shapes of the flexible widening parts on the support frame side and the weight side are preferably the same as each other from the viewpoint of production conveniences, such as geometric design, photolithography and etching.

Composing the flexible arm with the flexible parallel part and the flexible widening part minimizes the lowering of output of the sensor element and increases the mechanical strength. It is preferable to combine the sensor element with a regulating plate to assure the shock resistance of the sensor element. Glass, ceramic, or IC substrate may be used as the regulating plate.

In the semiconductor-type three-axis acceleration sensor according to the present invention, it is preferable that W2/W1, the ratio of the width W2 of the flexible parallel part to the width W1 of a first connection end (the connection end of the flexible arm), be 0.2 or more to 0.6 or less.

The value obtained by dividing the width W2 of the flexible parallel part by the width W1 of the connection end of the flexible arm represents a ratio of widening of the flexible widening part. The larger the ratio of W2/W1 becomes, the less extensive the flexible widening part in the vicinity of the connection end of the flexible arm becomes, resulting that a shock resistance is inferior, but drop in output can be suppressed. When the ratio of W2/W1 is less than 0.2, the output significantly lowers. When the W2/W1 is more than 0.6, it is difficult to obtain the effect of improvement in the shock resistance.

It is preferable that L2/L0, a ratio of the length L2 of the flexible parallel part to the total length L0 of the flexible arm, be 0.4 or more to 0.9 or less.

The value obtained by dividing the length L2 of the flexible parallel part by the total length L0 of the flexible arm represents a ratio of a length except for the flexible widening part to the total length of the flexible arm. When the ratio becomes small, a ratio of the flexible widening part to the flexible arm becomes larger, improving the shock resistance, however, the output is substantially lowered. When the ratio of L2/L0 is less than 0.4, the output significantly decreases. When L2/L0 is more than 0.9, it is difficult to obtain the effect of improvement in the shock resistance.

In the semiconductor-type three-axis acceleration sensor according to the present invention, the plurality of piezo resistors for measuring at least one of the three axis components of the acceleration applied from the outside may be located with both terminals thereof away in the longitudinal direction of the flexible arm from the maximum stress part on the flexible widening part.

The length of the flexible widening part is made as short as possible to lengthen the flexible arm effectively working, thereby a high output can be obtained. It is preferable that the initial resistance of the piezo resistor be 10 kΩ or higher from the viewpoint of an electrical processing because the piezo resistor measures change in resistance when deformed, and the piezo resistor is about 80 μm in length. It is preferable that the piezo resistors span the connection end of a flexible parallel part being a border between the flexible widening part and the flexible parallel part, considering that a terminal of the piezo resistor meets with the maximum stress part occurring on the flexible widening part, the length of the flexible widening part is made as short as possible, and the sensor element itself is downsized.

Not all of the X-axis, Y-axis, and Z-axis piezo resistors need extending over the connection end of the flexible parallel part. It is possible to lower the output of the piezo resistor by keeping it away from the maximum stress part. In general, the Z-axis piezo resistor is higher in output than the X-axis and Y-axis piezo resistors, so that the Z-axis piezo resistor may be located with both terminals thereof away in the longitudinal direction of the flexible arm from the maximum stress part in order to lower the output of Z-axis, thereby narrowing the difference between outputs of the X-axis, Y-axis and Z-axis. For example, only the Z-axis piezo resistor may be located within the flexible parallel part or the flexible widening part.

The Z-axis piezo resistor on the side of the support frame and the Z-axis piezo resistor on the side of the weight may be shifted in different directions from the maximum stress part. It is, however, preferable to shift the Z-axis piezo resistors on the sides of the support frame and of the weight in the same direction from the maximum stress part, because it is easier to suppress the development of offset voltage when the Z-axis piezo resistors are combined into a bridge.

In the semiconductor-type three-axis acceleration sensor according to the present invention, the plurality of piezo resistors for measuring at least one of the three axis-components of the acceleration applied from the outside may be located away from a width centerline of the flexible arm to a side end of the flexible arm on the upper surface of the flexible arm.

Furthermore, it is preferable that the plurality of piezo resistors for measuring an axis-component vertical to the top surface of the weight among the three axis-components of the acceleration applied from the outside be located on the width centerline of the flexible arm on the upper surface of the flexible arm.

Since the flexible arm bends not only in the longitudinal direction but in the widthwise direction, a widthwise bending occurs with respect to the width centerline of the flexible arm. Stress is smaller on the width centerline, but the farther the distance from the width centerline in the widthwise direction of the flexible arm is, the higher the stress becomes. It is preferable that the Z-axis piezo resistor be located in the vicinity of the width centerline and the X-axis and the Y-axis piezo resistors be located outside from the width centerline in the widthwise direction of the flexible arm in order to lower the output of Z-axis because the Z-axis piezo resistor is generally higher in output than the X-axis and/or the Y-axis piezo resistor, thereby narrowing the difference between outputs of the X-axis, Y-axis and Z-axis.

It is preferable that, when the X-axis or the Y-axis piezo resistor is shifted outside of the width centerline in the widthwise direction of the flexible arm, they are located inside from the side end of the flexible arm by at least the width of the piezo resistor. The piezo resistor located too close to the side end might generate unwanted stress or cause imbalance in stress because metal lead wires connecting the piezo resistors are at the side end of the flexible parallel part.

As described above, the X-axis/Y-axis piezo resistor is located away from the width centerline of the flexible arm, while the Z-axis piezo resistor is located on the width centerline of the flexible arm and away in the longitudinal direction of the flexible arm from the maximum stress part on the flexible widening part, which can further reduce the output of the Z-axis piezo resistor.

In the semiconductor-type three-axis acceleration sensor according to the present invention, the Z-axis piezo resistor is located on the width centerline on the upper surface of the flexible arm, and the X-axis and the Y-axis piezo resistors are located outside in the widthwise direction of the flexible arm from the width centerline on the upper surface of the flexible arm. The X-axis and Y-axis resistors and metal lead wires acting as a dummy may be symmetrically located with respect to the width centerline.

Locating the Z-axis piezo resistor on the width centerline on the upper surface of the flexible arm and the X-axis piezo resistor outside in the widthwise direction of the flexible arm to narrower the difference between outputs of the X-axis, Y-axis and Z-axis piezo resistors means that these resistors are located only on a side of the width centerline on the upper surface of the flexible arm. Furthermore, the metal lead wires or the like for connecting the piezo resistors are also located one-sidedly. Locating the piezo resistors one-sidedly with respect to the width centerline on the upper surface of the flexible arm makes uneven a stress produced by an external force in the widthwise direction of the flexible arm. Rise in a sensor temperature may generate stress on the flexible arm due to difference in thermal expansion coefficients between silicon, insulation layer, metal lead wires and so on composing the flexible arm. It is therefore preferable to symmetrically locate the components with respect to the width centerline on the upper surface of the flexible arm. The Z-axis piezo resistor may be located on the width centerline, while the X-axis/Y-axis piezo resistor may be located away from the width centerline. Alternatively, all the X-axis, Y-axis and Z-axis piezo resistors may be located away from the width centerline. It is preferable that the piezo resistors located away from the width centerline have ones symmetrically located to the piezo resistors with respect to the width centerline. The piezo resistors symmetrically located with respect to the width centerline to other piezo resistors may have the same structure as the other piezo resistors. When the piezo resistors having the same structure are symmetrically located, two or four piezo resistor pieces, which are half or quarter as long as a resistor to be required, are symmetrically located on the upper surface of the flexible arm with respect to the width centerline and the terminals of the two or the four piezo resistor pieces are connected to each other in series, which can be taken as required resistors.

It is thus preferable to divide a piezo resistor for each axis into even number, such as two or four. The division into even number makes it possible to connect a terminal of a divided piezo resistor piece to a terminal of another divided piezo resistor piece by a straight metal lead wire, and the opposite terminals of the piezo resistor pieces can be connected widthwise in the shortest distance. Division into odd number does not enable such an easy connection. In the case of the odd division, a metal lead wire approximately equal in length to a partially divided piezo resistor piece needs to be provided in parallel to the piezo resistor piece. It is preferable that the number of divisions be limited to up to four for the reason of manufacture. In the flexible arm with the X-axis and the Z-axis piezo resistors, eight piezo resistor pieces are arranged in the widthwise direction of the flexible arm when each of the piezo resistors is divided into four pieces. Since the flexible arm has a tendency to narrow in width to increase the output of acceleration, too many resistor pieces are not preferable because production yield lowers.

The X-axis, Y-axis and Z-axis piezo resistors may be divided into two or four in the longitudinal direction thereof. Two or four piezo resistor pieces divided into two or four can be symmetrically located with respect to the width centerline. In this case, it is preferable that the Z-axis piezo resistor pieces are located near the width centerline, while the X-axis and the Y-axis piezo resistor pieces are located outside in the widthwise direction of the flexible arm from the Z-axis piezo resistor pieces and symmetrically with respect to the length centerline of the flexible arm.

The Z-axis piezo resistor is not divided, but only the X-axis and Y-axis piezo resistors may be divided to decrease the output of the Z-axis piezo resistor in comparison with those of the X-axis and Y-axis piezo resistors. The Z-axis piezo resistor is not divided, but located on the width centerline, while the X-axis/Y-axis piezo resistor can be symmetrically located with respect to the width centerline. The terminals of the X-axis piezo resistor far from the connection end of the flexible arm need short-circuiting, so that the Z-axis piezo resistor is preferably shifted as much as possible toward the connection end of the flexible arm. Even if the Z-axis piezo resistor is shifted toward the connection end of the flexible arm, the metal lead wires or the like for connecting the X-axis piezo resistors are inevitably lengthened, therefore it is preferable to divide the Z-axis piezo resistor so that it can be as equal as possible in length to the X-axis and/or Y-axis piezo resistor. The X-axis/Y-axis piezo resistor may be divided into two, and the Z-axis piezo resistor may be divided into four.

The plurality of piezo resistors for measuring at least one of the three axis-components of the acceleration may be located with both terminals thereof away in the longitudinal direction of the flexible arm from the flexible widening part. For example, the Z-axis piezo resistor can be shifted from the maximum stress part to reduce the output. One of divided Z-axis piezo resistor pieces may be shifted toward the vicinity of the connection end of the flexible arm, while the other of them is shifted far from the connection end of the flexible arm and toward the length centerline, but it is inevitable that a wiring for connecting the Z-axis piezo resistor pieces is lengthened. It is preferable that both the Z-axis piezo resistor pieces be shifted either close to or far from the connection end of the flexible arm.

A direct connection of piezo resistors to metal lead wires may increase contact resistance, which cannot provide a desirable connection. Connection through a high-concentration diffusion layer can provide a better connection both for the piezo resistors and the metal lead wires. For this reason, connection for divided piezo resistors should be performed in the following order; sensor terminal—metal lead wire—high-concentration diffusion layer—piezo resistor—high-concentration diffusion layer—metal lead wire for connection—high-concentration diffusion layer—piezo resistor—high-concentration diffusion layer—metal lead wire—sensor terminal. Formation of the metal lead wire for connection with a high-concentration diffusion layer eliminates the formation of a through-hole required in an insulation layer between the piezo resistor and the metal lead wire. A terminal of the piezo resistor farther from the connection end of the flexible arm can be connected without the use of a through-hole, facilitating adjustment of displacement in location between the X-axis and Z-axis piezo resistor pieces, and enabling the elimination of through-holes from the flexible parallel part. This minimizes the generation of stress due to shape that may cause noise when the flexible arm is deformed. The high-concentration diffusion layer is required to have a small sheet-resistance and small change in resistance for stress, so that the diffuse density of atoms in the layer which is different in valence from silicon should be increased by three orders that in the piezo resistor. Using the high-concentration diffusion layer as a connection lead wire for divided piezo resistor pieces results in advantages that the generation of noise is reduced without increasing manufacturing man-hour.

Although, in the above description, the piezo resistor pieces are symmetrically located with respect to the width centerline on the upper surface of the flexible arm, a dummy element can be used instead of the piezo resistor piece to be symmetrically located. It is preferable that dummies to be disposed include the X-axis or Y-axis piezo resistor pieces as well as metal lead wire, connections and the like. There is no need to connect a dummy metal lead wire to piezo resistor terminals. It is therefore preferable that dummy piezo resistors and dummy metal lead wire are as equal as possible in material, width, thickness and the like to the actual piezo resistors and metal lead wire.

ADVANTAGES OF THE INVENTION

According to the present invention, there is provided a semiconductor-type three-axis acceleration sensor having a high shock resistance, a small difference in output between the X-axis (Y-axis) and Z-axis piezo resistors, a small size, high sensitivity and a high output.

BRIEF DESCRIPTION OF THE DRAWINGS

FIG. 4 shows explanatory views of dimensions of the sensor element used in the present invention, in which

EXPLANATION OF NUMERAL REFERENCES

Figure 1:
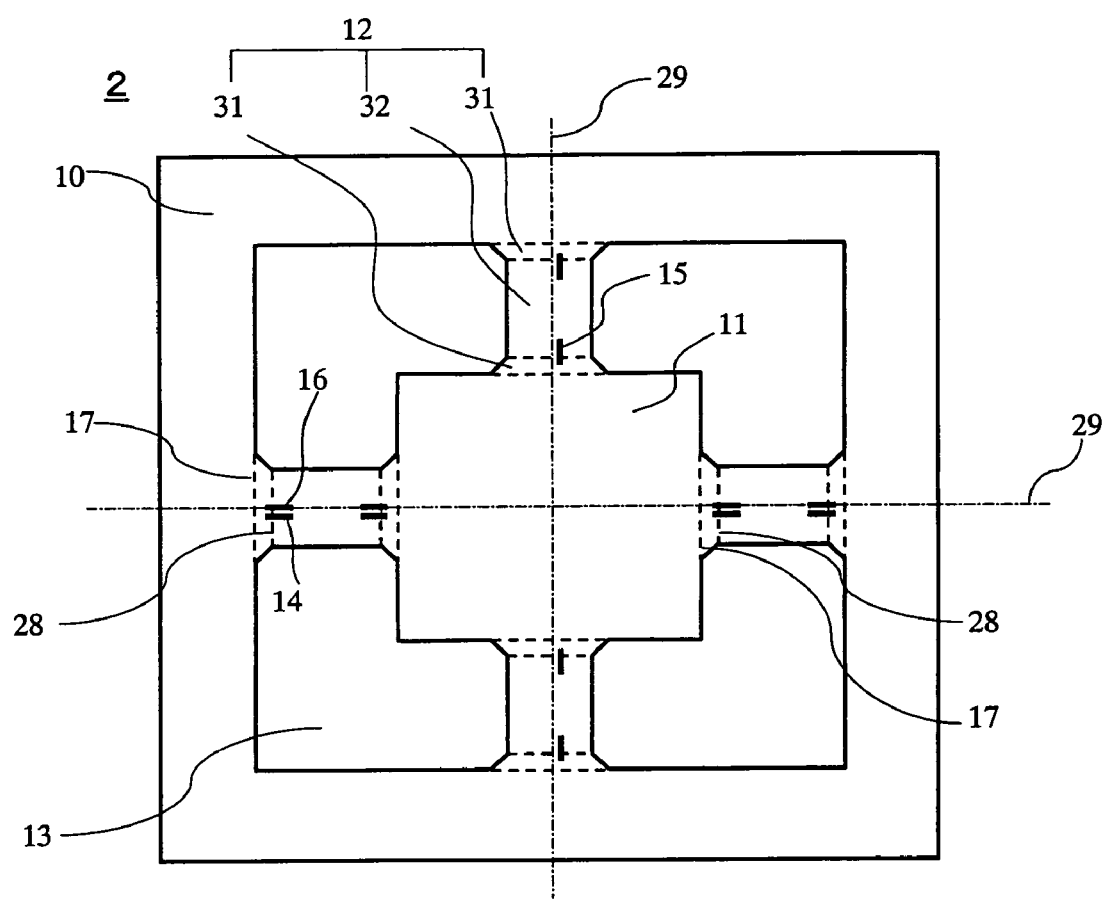
FIG. 1 is a schematic plan view of a sensor element used in the present invention.

1 Acceleration sensor
2 Sensor element
10 Support frame
11 Weight
12 Flexible arm
14 X-axis piezo resistor
15 Y-axis piezo resistor
16 Z-axis piezo resistor
17 First connection end (Connection end of a flexible arm)
28 Second connection end (Connection end of a flexible parallel part)
29 Width centerline (of a flexible arm)
30 Length centerline (of a flexible arm)
31 Flexible widening part
32 Flexible parallel part

BEST MODE FOR CARRYING OUT THE INVENTION

Embodiments of the present invention are described in detail below with reference to the drawings. For sake of simplicity, the same components and portions are given the reference characters.

Figure 2:
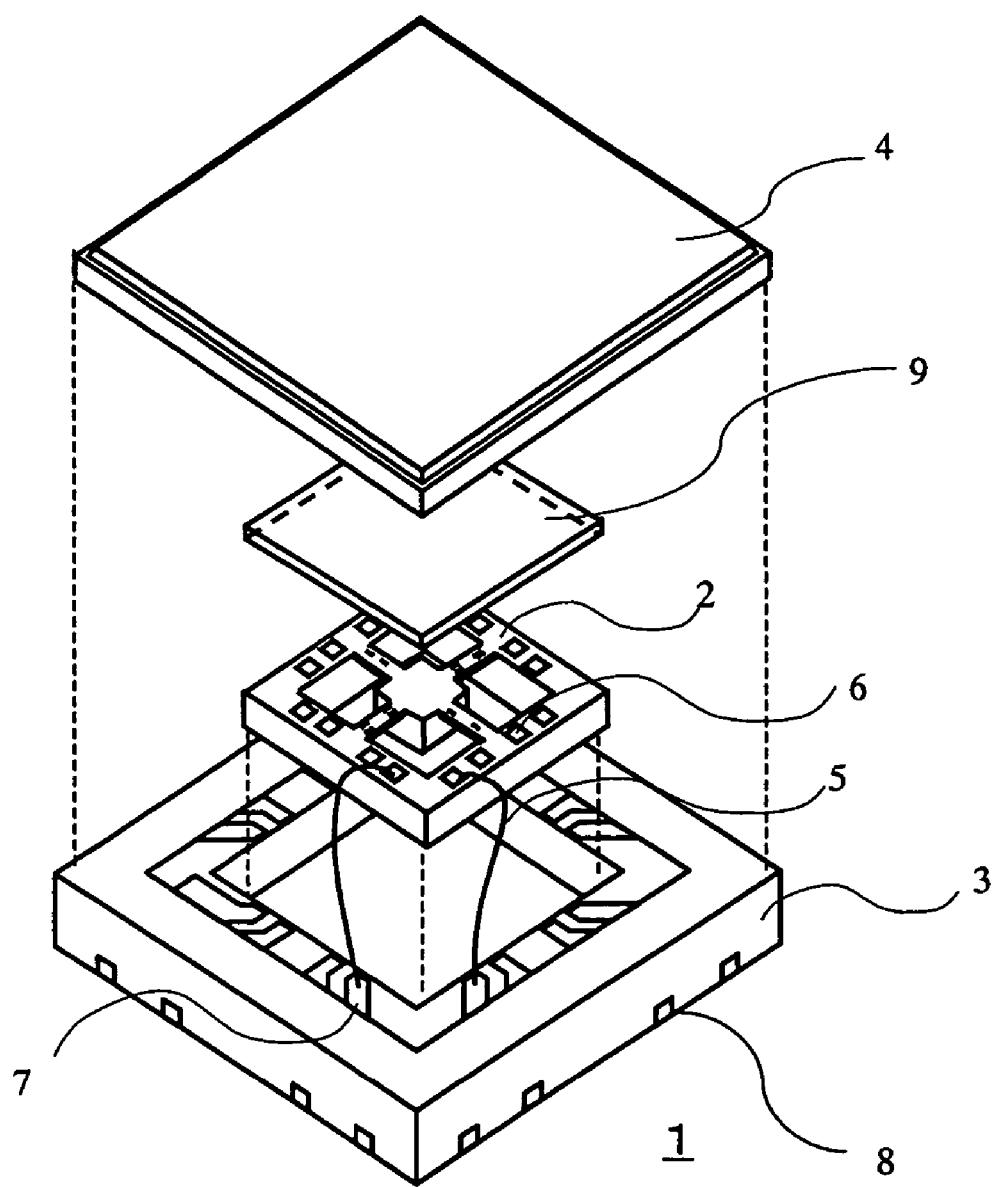
FIG. 2 is an exploded perspective view of an acceleration sensor according to the present invention.
Figure 3:
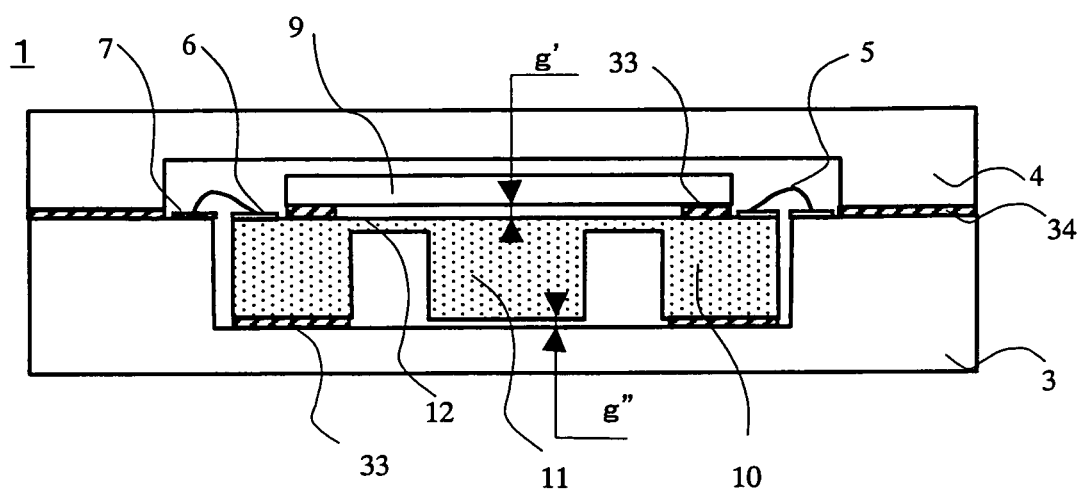
FIG. 3 is a cross-sectional view of the acceleration sensor according to the present invention.

FIG. 1 is a schematic plan view of a sensor element used in an acceleration sensor according to the embodiment of the present invention. FIG. 2 is an exploded perspective view of the acceleration sensor, and FIG. 3 is a cross-sectional view of the acceleration sensor. As shown in the plan view of FIG. 1, in the sensor element 2, a support frame 10 formed at the periphery of a silicon single crystal substrate is connected to a weight 11 formed in a center by a thin beam-shaped flexible arm 12. The flexible arm 12 is composed of a flexible parallel part 32 and flexible widening parts 31. The flexible widening parts 31 are provided at the both ends of the flexible parallel part 32 to connect the flexible arm to the upper surfaces of the support frame and the weight. Parts for connecting the flexible arm 12 to the support frame 10 and the weight 11 are referred to as "connection ends of a flexible arm" 17. A part for connecting the flexible parallel part 32 to the flexible widening part 31 is referred to as "connection end of a flexible parallel part" 28. X-axis piezo resistors 14 and Z-axis piezo resistors 16 are provided on the upper surfaces of the same flexible arms 12. Y-axis piezo resistors 15 are provided on the upper surfaces of the other flexible arms 12. The Z-axis piezo resistors 16 are located on a width centerline 29 of the flexible arm. The X-axis and Y-axis piezo resistors 14 and 15 are shifted outward in the widthwise direction of the flexible arm with respect to the width centerline 29. As can be seen from the cross section of the sensor element 2 shown in FIG. 3, the flexible arms 12 are provided on upper sides of the weight 11 and the support frame 10. On the upper surfaces of the flexible arms are provided plural pairs of the piezo resistors for each axis and metal lead wires. Those resistors and lead wires are not shown in FIG. 3.

An acceleration sensor 1 according to the present invention is described with reference to the exploded perspective view shown in FIG. 2 and the cross-sectional view shown in FIG. 3. The sensor element 2 is fixed in a protective case 3 by adhesive 33 containing hard plastic balls with a diameter of 10 μm. A gap g" between the bottom surface of the weight 11 of the sensor element 2 and the inside bottom surface of the protective case 3 is maintained by a spherical diameter of the hard plastic balls to be 10 μm. The gap g" restricts the move of the weight 11 when the acceleration sensor 1 is subjected to extreme acceleration to prevent the flexible arms 12 from breaking down. The sensor terminals 6 of the sensor element are connected to the case terminals 7 of the protective case by lead wires 5. The lead wires 5 of uncoated gold with a diameter of 25 μm are welded to the sensor terminals 6 and the case terminals 7 by ultrasonic bonding. A regulating plate 9 is fixed on the sensor element by the adhesive 33 containing hard plastic balls with a diameter of 10 μm. A 0.2 mm thick soda lime glass is used as the regulating plate 9. A gap g' between the regulating plate 9 and the weight 11 also restricts the excessive move of the weight within the gap g' to prevent the flexible arms from breaking down. A protective case lid 4 is fixed to the protective case 3 with epoxy-based adhesive 34 to assemble the acceleration sensor 1.

Figure 4A:
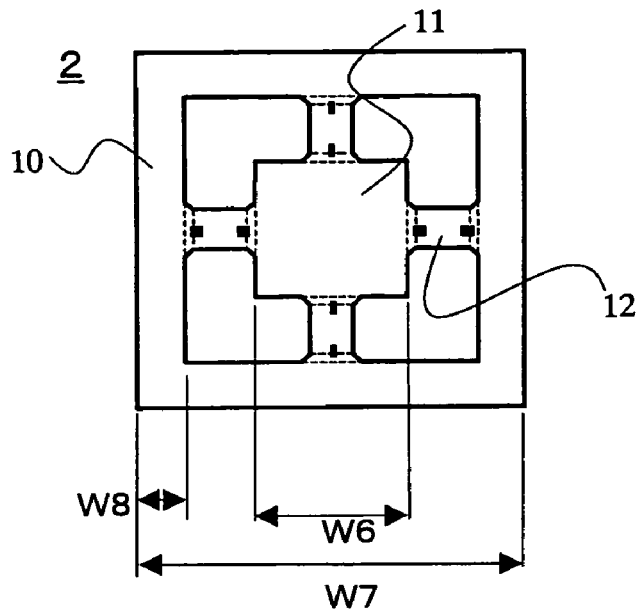
FIG. 4A is a plan view of the sensor element, FIG. 4B an enlarged plan view of a flexible arm and FIG. 4C a cross-sectional view partially showing the flexible arm.
Figure 4B:
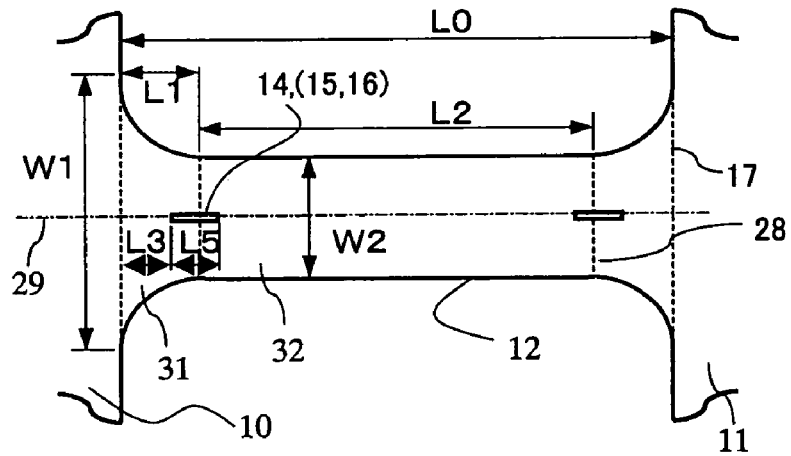
Figure 4C:
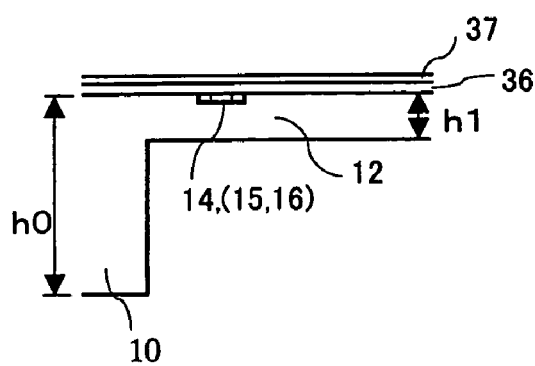

FIGS. 4A, 4B and 4C show the principal dimensions of the sensor element used in the following experiments in the present invention. The sensor element 2 is 2000 μm in outer dimension W7. The support frame 10 is 250 μm in width W8. The weight 11 is 700 μm in width W6. The flexible parallel part 32 of the flexible arm 12 is 75 μm in width W2. The width W1 of the flexible widening part 31 at the connection end of the flexible arm is tentative and varied for experiments. The flexible arm 12 is 400 μm in length L0. The length L1 of the flexible widening part 31 is tentative and varied for experiments. The piezo resistor 14 (15 and 16) is 4 μm in width and 80 μm in length L5. The distance (a maximum stress part) L3 between the connection end 17 of the flexible arm and terminals of the piezo resistors 14 (15 and 16) is tentative and varied for experiments. The flexible arm is 6 μm in thickness h1. The support frame 10 and the weight 11 are about 632 μm in thickness h0. Unless otherwise specified, the sensor element with the above dimensions is used in the present embodiments.

The following is a brief description of how to manufacture the sensor element 2. A "silicon on insulator" (SOI) wafer was used which had such a structure that an about 1 μm thick silicon oxide layer and a 6 μm thick silicon layer were stacked on a 625 μm thick silicon plate. Patterning was performed with a photoresist, and boron of 1 to $3 \times 10^{19}$ atoms/cm$^3$ was implanted to the silicon layer to produce piezo resistors. For high-concentration diffusion layers, boron of 1 to $3 \times 10^{21}$ atoms/cm$^3$ was implanted to the silicon layer. A 0.2 μm to 0.5 μm thick insulation layer of silicon oxide was formed to protect the piezo resistors from an external ion and to establish good electrical insulation between silicon, aluminum wirings and electrodes. The aluminum wirings, electrodes, flexible arms and so on which are connected to the piezo resistors were formed by a photo-resist patterning with use of a film forming apparatus of sputtering, a dry etching apparatus and so on. Only the silicon layer was etched because the silicon oxide layer in the SOI wafer acted as an etching stopper. The wafer having the piezo resistors were bonded to a dummy substrate with the surface having the piezo resistor downward by resin blended with metallic powder of a high thermal conductivity. When a portion of the 625 μm thick silicon plate for the SOI wafer is dry-etched, it would take a long time to perform dry etching in plasma into which SF$_6$ and oxygen are introduced. For this reason, it is important to cool a work piece so that bonding is performed to the dummy substrate with a high heat radiating property by adhesive with a high thermal conductivity. Only silicon was dry-etched, so that the silicon plate was etched, but the silicon oxide layer was left. The dummy substrate with the silicon oxide layer left on the substrate was soaked in fluoric acid solution to remove the silicon oxide layer with chemical etching. The SOI wafer, on which the flexible arms, weights and support frames were formed, was separated into chips of acceleration sensor elements by using a cutting wheel, while the SOI wafer was bonded to the dummy substrate, and thereafter, adhesive on the chips was removed by solvent to obtain the acceleration sensor elements.

Experiment 1

Figure 5:
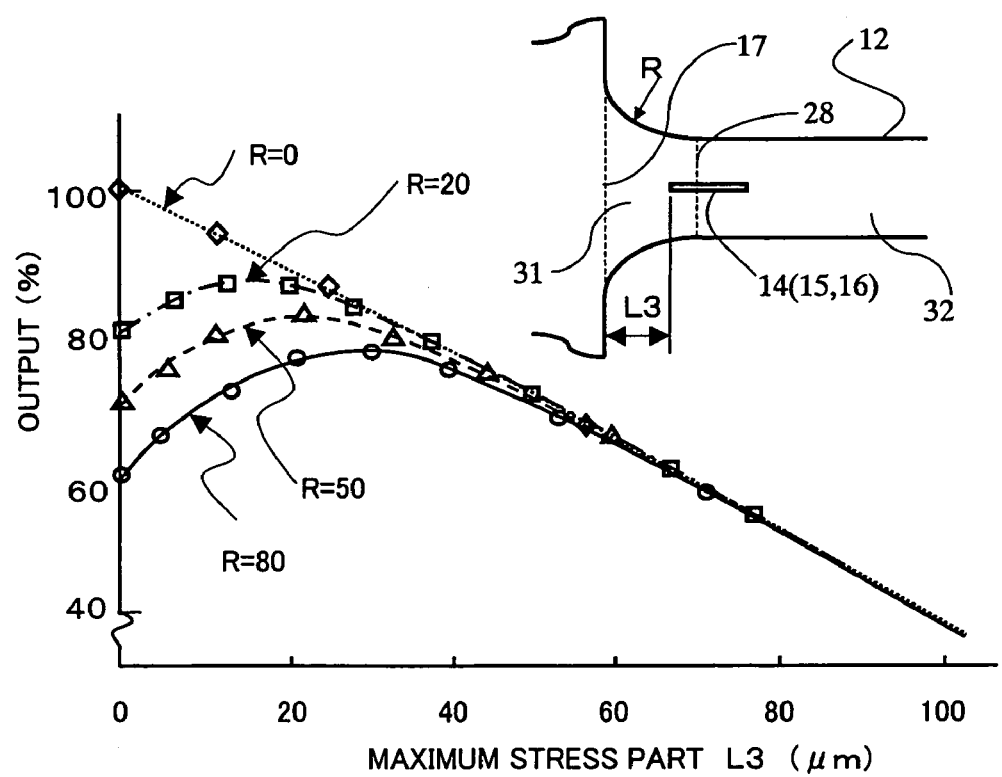
FIG. 5 is a graph explaining a relationship of an output vs. a position of a maximum stress part with a radius R of a ridge of a flexible widening part as a parameter.

FIG. 5 is a graph showing a relationship of outputs to positions (L3) of maximum stress parts with a radius R of ridges of a flexible widening part as a parameter. FIG. 5 shows a case where the ridges of the flexible widening part 31 are ¼ circular arc. The flexible widening part, of which the ridges are a straight line or a noncircular arc, showed a similar tendency, so that the graph of the ¼ circular arc is shown here as a representative. In FIG. 5, radius R=0 μm means that the flexible winding part 31 does not exist, which shows a conventional sensor element only with a flexible parallel part 32 on a flexible arm. A maximum stress part in the conventional sensor element was at a connection end 17 of a flexible arm, at which L3=0 μm, and when a terminal of a piezo resistor 14, (15 or 16) was located at the connection end, an output of the piezo resistor was set to 100%. Positions (L3) indicating the maximum stress part were obtained while changing a radius R to 20 μm, 50 μm and 80 μm. The output of the piezo resistor was measured to obtain the ratio of the output of the piezo resistor to outputs at the maximum stress part at R=0 μm. The outputs were measured while applying an acceleration of 3 G (3 times gravity) in the Z-axis direction.

As can be seen from FIG. 5, the maximum stress parts L3 occurred at positions away by approximately half of the radii R from the connection end of the flexible arm 17. The outputs lowered according as the radii R increased. The maximum stress parts L3 being located at positions about half of the radii R away mean that the parts were located in the flexible widening part, which proved that the flexible widening part can be regarded as part of the flexible arm. Lowering in output according as the radii R increase shows that the flexible widening part is less flexible according as the radii R increase. Although a detailed description is omitted, in the flexible widening part with straight-line-shaped or bell-shaped ridges, L3 was further increased and the output was significantly decreased. It has been found that a shape, in which a center of radius R for a circular arc is shifted and which gently changes in the vicinity of the connection end 28 of the flexible parallel part and steeply changes in the vicinity of the connection end 17 of the flexible arm, could decrease L3 and the reduction in output.

Experiment 2

Figure 6:
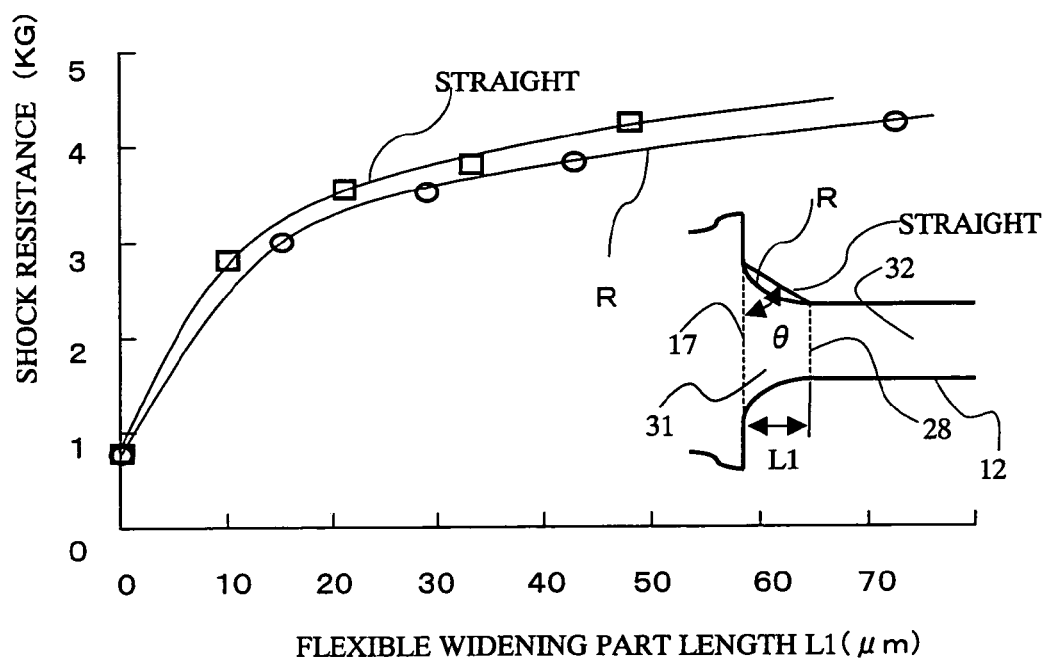
FIG. 6 is a graph showing a relationship of shock resistance vs. a length L1 of a flexible widening part.

The following is a description of how to improve a shock resistance by providing a flexible widening part. FIG. 6 is a graph showing a relationship of shock resistances to lengths L1 of the flexible widening part, in which ridges of the flexible widening part are formed by a ¼ circular arc (R) with a radius R of 0 μm to 70 μm or a straight line with an angle of 45 degrees and in which distance (length L1 of the flexible widening part) between a connection end 17 of a flexible arm and a connection end 28 of a flexible parallel part is changed between 0 μm to 45 μm. Twenty acceleration sensors for each ridge were produced for shock resistance tests. A pendulum impact tester was used for the shock resistance test. An impacting time was set at 0.2 milliseconds. Accelerations of 1000 G to 5000 G were applied in steps of 100 G. Shock resistances may vary with direction, so that eighteen impacts, that is, six directions (a positive and a negative directions of X-axis, Y-axis and Z-axis) multiplied by three were/applied for each condition in the experiment. After the shock resistance test had been finished, acceleration of 3 G was applied by a vibrator. Judgment was made about whether output was delivered or not.

An acceleration sensor failing to output was judged as breakdown. An acceleration value at which an acceleration sensor was judged as breakdown was regarded as shock resistance value when at least one out of twenty acceleration sensors was judged as breakdown.

A conventional sensor element without a flexible widening part (L1=0) in FIG. 6 was about 800 G in shock resistance. It has been confirmed that increase in length L1 of the flexible widening part to 20 µm gives a shock resistance of 3000 G or higher. Judging from the fact that a value of impact applied to the acceleration sensor when naturally dropped from the height of 1 m on a 100 mm thick wooden board was 1500 G to 2000 G, 3000 G was enough shock resistance for the acceleration sensor mounted onto a mobile equipment. At the same length of a flexible widening part, the flexible widening part with straight-lined ridges is higher in shock resistance, and the reason is considered that the flexible arm is wider in the vicinity of the connection end of a flexible parallel part than the flexible widening part with a circular arc ridge.

Experiment 3

Figure 7A:
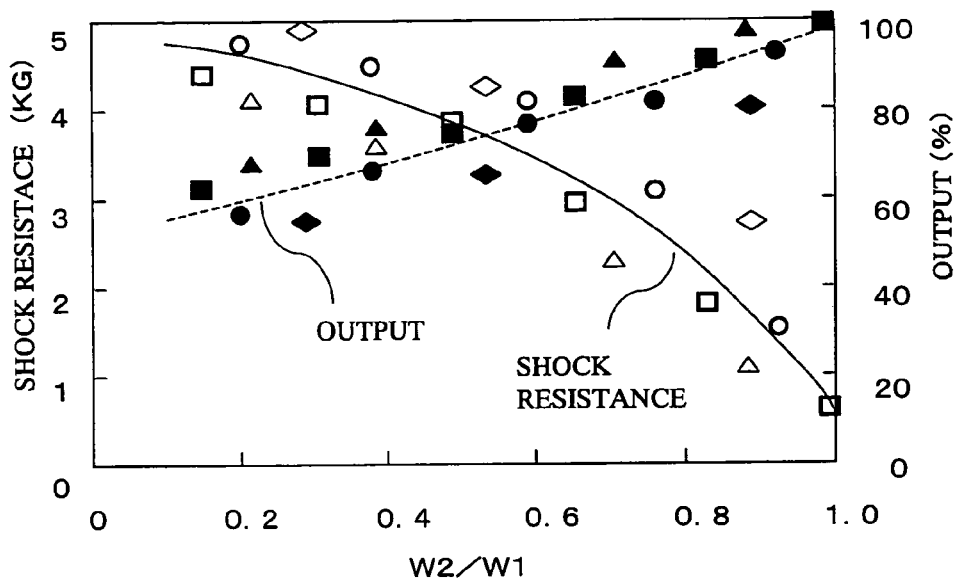
FIG. 7 is a graph showing a relationship of shock resistance and an output vs. W2/W1.
Figure 7B:
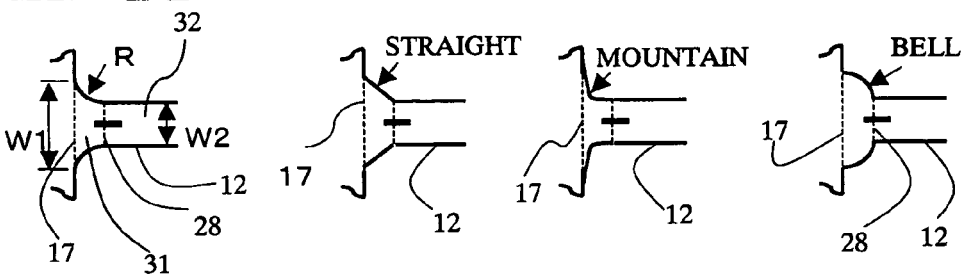

FIG. 7A is a graph showing a relationship of shock resistances (KG) and outputs (%) to W2/W1, the ratio of the width W2 of the flexible parallel part 32 to the width W1 of the flexible widening part at the connection end 17 of the flexible arm. The width W2 of the flexible parallel part 32 in the flexible arm 12 was kept constant at 75 µm. As shown in the legends of FIG. 7B, the ridges of the flexible widening part were changed to ¼ circular arc with a radius R (indicated by ■ and □), a straight line (indicated by ● and ○), a mountain shape being steep in the vicinity of the connection end of the flexible arm (indicated by ▲ and ∆), and a bell shape changing sharply in shape in the vicinity of the connection end of a flexible parallel part (indicated by ♦ and ◇). Twenty samples of the acceleration sensors with these ridges for each of the shapes were produced and evaluated by the same method as in the experiment 2 in the shock resistance test. Acceleration of 3 G was applied to the samples by a vibrator. The output of a conventional acceleration sensor with W2/W1=1, that is, without a flexible widening part, was taken as 100%. Average values of outputs of the twenty accelerator sensors with the flexible widening parts, in which the ratio of W2/W1 was changed, were plotted on the graph in FIG. 7A. As a whole, when the ratio of W2/W1 increases, the shock resistance tends to lower, but the output increases. Those with the bell-shaped ridges, in which the flexible arm 12 widens in the vicinity of the connection end 28 of a flexible parallel part, have the advantage in shock resistance, while those with the mountain-shaped ridges, in which the flexible arm 12 widens in the vicinity of the connection end 17 of the flexible arm, have the advantage in output. It has been ascertained that these results show that the dimensions and shapes of the flexible widening parts can be selected from the viewpoint of shock resistance and output required for the acceleration sensor.

When the ratio of W2/W1 is greater than 0.6, it is difficult to obtain a shock resistance of 3000 G or more. When the ratio of W2/W1 is smaller than 0.2, the output lowers by 35% or more, which is not preferable. From these results, it has been ascertained that a preferable value of W2/W1 is from 0.2 or more to 0.6 or less.

Experiment 4

Figure 8A:
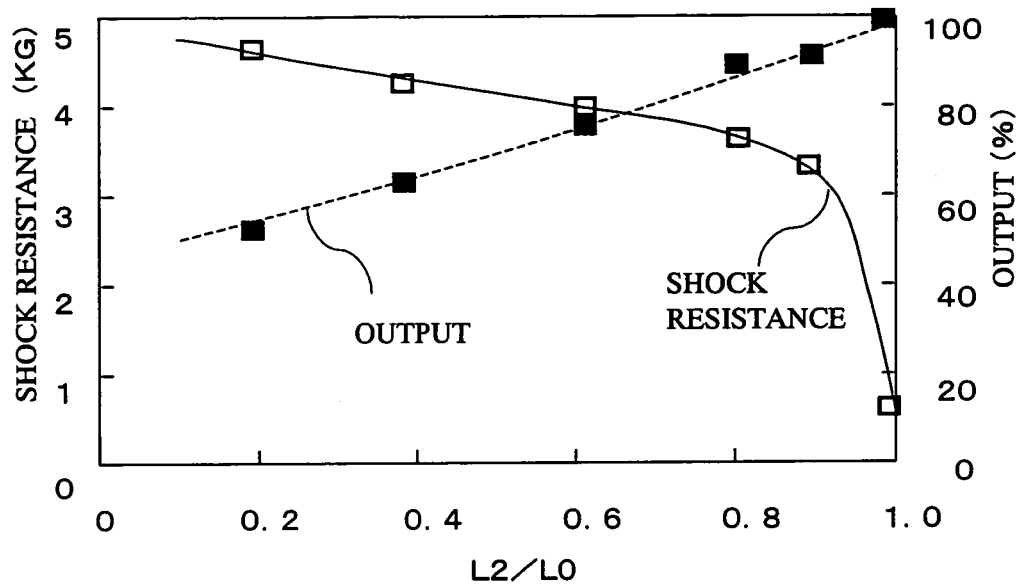
FIG. 8 is a graph showing a relationship of shock resistance and an output vs. L2/L0.
Figure 8B:
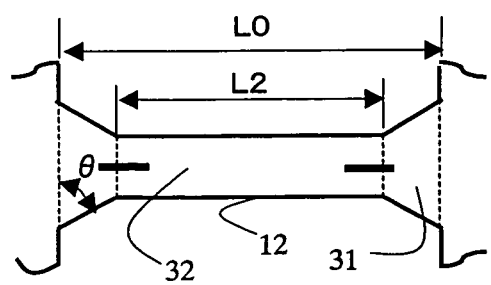

FIG. 8A is a graph showing shock resistances and outputs as L2/L0, the ratio of the length L2 of the flexible parallel part 32 to the total length L0 of the flexible arm 12, is changed. In the plan view of the flexible arm shown in FIG. 8B, the total length L0 of the flexible arm 12 was kept constant at 400 µm and the width of the flexible widening part 31 at the connection end of a flexible arm was kept constant at 160 µm. The length L2 of the flexible parallel part 32 was changed by changing a gradient θ of the ridge of the flexible widening part. The ridge was a straight line in shape to facilitate collection of data. For samples in which the length L2 of the flexible parallel part 32 was changed by changing the gradient θ of the ridges, twenty samples were produced for each length and evaluated by the same method as in the experiment 2 in the shock resistance test. Acceleration of 3 G was applied to the samples by a vibrator. The output of a conventional acceleration sensor with L2/L0=1, that is, without a flexible widening part, was taken as 100%. Average values of outputs of the twenty acceleration sensors were plotted on the graph in FIG. 8A.

When the ratio of L2/L0 is greater than 0.9, it is difficult to obtain a shock resistance of 3000 G or more. When the ratio of L2/L0 is smaller than 0.4, the output lowers by 35% or more, which is not preferable. From these results, it has been ascertained that a preferable value of L2/L0 is from 0.4 or more to 0.9 or less.

Experiment 5

Figure 9:
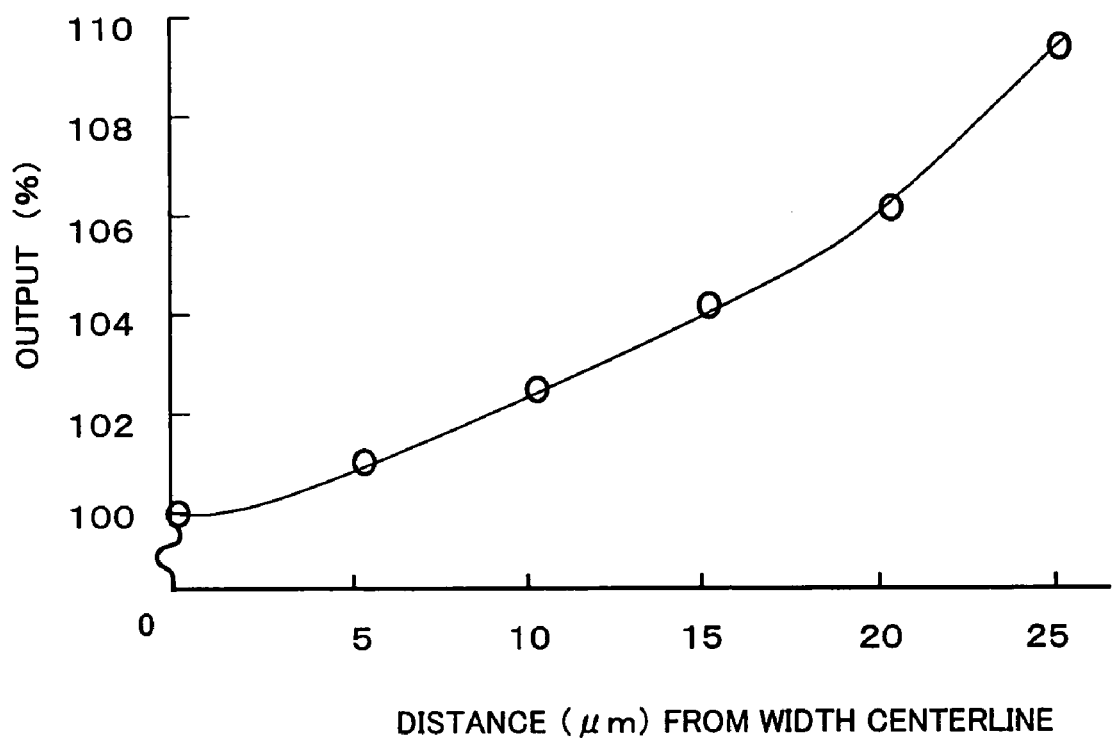
FIG. 9 is a graph explaining a relationship between an output and a distance from a width centerline.

The following is a description of a relationship between outputs and distances from a width centerline of the flexible arm in the piezo resistors, referring to a graph in FIG. 9. The outputs of the piezo resistors were measured while changing the position of the piezo resistors from 0 µm to 25 µm away from the width centerline in increments of 5 µm. The ridges of the flexible widening parts were taken as ¼ circular arc with a radius R of 40 µm. The piezo resistor was located in such a manner that a terminal thereof was placed 30 µm away from the connection end of a flexible arm and the other terminal thereof was placed on the flexible parallel part with the resistor spanning the connection end of the flexible parallel part. Acceleration of 3 G was applied to samples by a vibrator. The output obtained when the piezo resistor was on a width centerline was taken as 100%. Average values of outputs of twenty acceleration sensors for each position were expressed by percentage.

The output could be increased according as the piezo resistor was away from the width centerline, that is, it could be raised by 9% when the piezo resistor was 25 µm away from the width centerline. Since the Z-axis piezo resistor is higher in output than the X-axis piezo resistor, it is desirable to narrower the difference between the outputs of the Z-axis and the X-axis (Y-axis) piezo resistors either by increasing the output of the X-axis piezo resistor, or by decreasing the output of the Z-axis piezo resistor. It is comparatively easy to decrease the output of the Z-axis piezo resistor, that is, to level the output with that of the X-axis piezo resistor by degrading the performance of the Z-axis piezo resistor. However, this means lowering the performance of the acceleration sensor. The Z-axis piezo resistor is formed on the width centerline on the upper surface of the flexible arm and the X-axis piezo resistor is formed on a position being away from the width centerline on the upper surface of the flexible arm, thereby enabling increase the output of the X-axis piezo resistor without decrease the output of the Z-axis piezo resistor, which has made it possible to further improve the performance of the acceleration sensor.

Experiment 6

Figure 10:
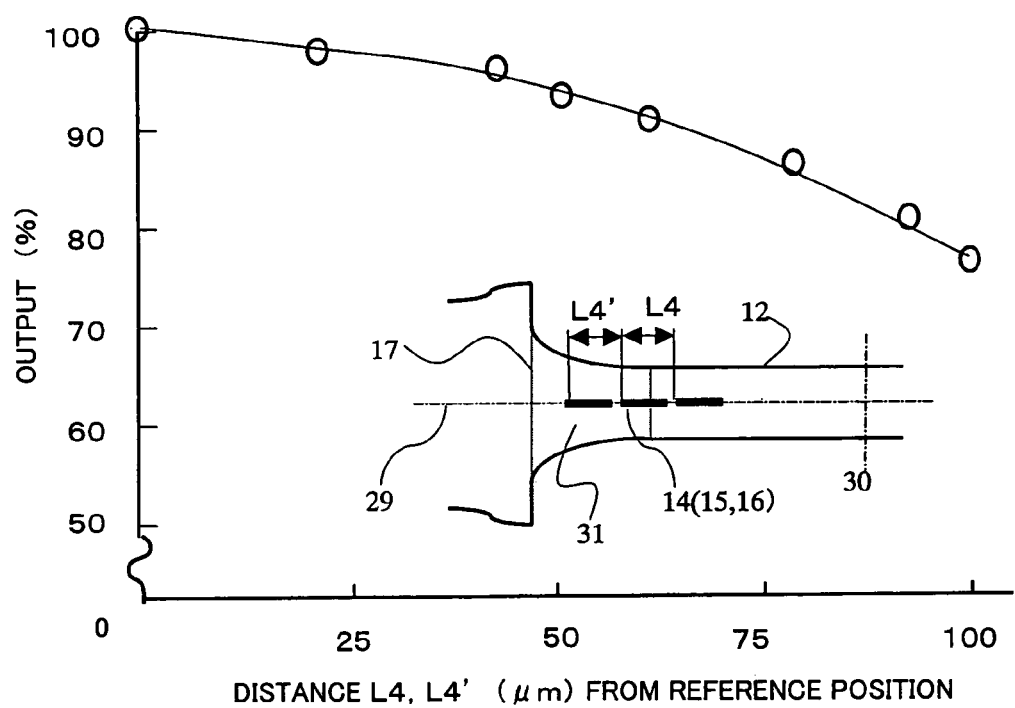
FIG. 10 is a graph explaining a relationship of an output vs. a distance L4, L4' from a reference position.

The following is a description of a relationship between outputs of the piezo resistors and distances L4 and L4' from a reference position with reference to FIG. 10, when the piezo resistors 14 (15 and 16) were located on the upper surface of the flexible arm while changing distances from the length centerline 30 of the flexible arm. A reference piezo resistor was located in such a manner that a terminal thereof was placed on the maximum stress part on the width centerline 29 of the flexible arm 12 and that the piezo resistor extended from that place beyond the connection end of the flexible parallel part. When a piezo resistor was moved in position up to 100 µm from the reference toward the connection end 17 of a flexible arm (L4') or toward the length centerline 30 of a flexible arm (L4), the relationship of the outputs of the piezo resistor with the positions is in the graph. The ridge of the flexible widening part 31 was taken as a ¼ circular arc with a radius R of 50 µm, and the length of the piezo resistor was taken as 80 µm. Acceleration of 3 G was applied to samples by a vibrator. The output obtained when the piezo resistor 14 (15 and 16) lay on the width centerline 29 of the flexible arm 12 and a terminal thereof lay on the maximum stress part was taken as 100%. Average values of outputs of twenty piezo resistors for each position away from the maximum stress part were expressed by percentage.

The output lowered according as the piezo resistor 14 (15 and 16) was shifted from the position of the reference piezo resistor toward the connection end 17 of the flexible arm (L4') or toward the length centerline 30 of a flexible arm (L4). And, the output decreased by about 25% when the piezo resistor was shifted by about 100 µm. Since differences in output between the piezo resistors shifted toward the connection end 17 (L4') and toward the length centerline 30 (L4) by the same distance as each other were several percent, the same legends are used for the directions L4 and L4' in FIG. 10. In the graph of FIG. 9, it has been described that the output of the X-axis piezo resistor can be raised by about 9% by locating the X-axis piezo resistor outward in the widthwise direction of the flexible arm with respect to the width centerline 29. The output can be decreased by about 25% by shifting the Z-axis piezo resistor by 100 µm from the maximum stress part on the width centerline. It has been ascertained that the combination of the above results can reduce the difference between outputs of the X-axis and Z-axis piezo resistors by about 35% without changing the output of the X-axis piezo resistor.

Figure 11A:
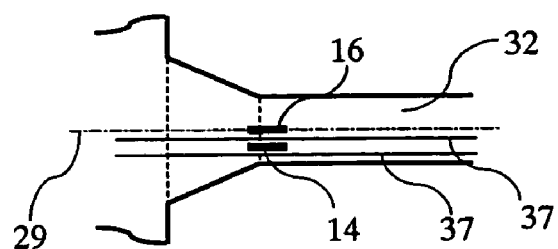
FIGS. 11A to 11E are enlarged plan views of flexible arms, explaining configuration of a dummy element and a dummy metal lead wire.
Figure 11B:
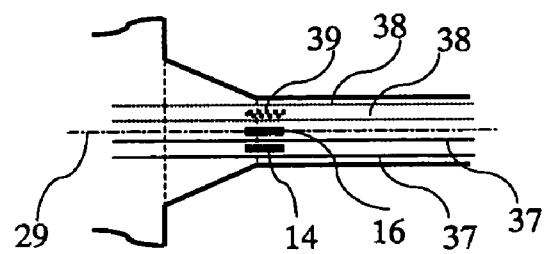
Figure 11C:
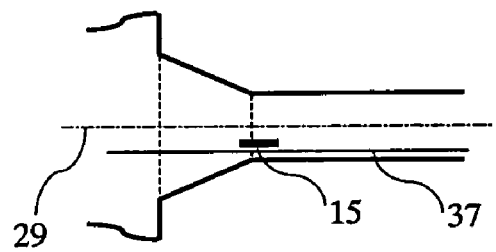

Referring to the graph of FIG. 9, it has been described that it is effective to locate the Z-axis piezo resistor on the upper surface of the flexible arm on the width centerline 29 and to locate the X-axis and Y-axis piezo resistors away from the width centerline 29 in the widthwise direction of the flexible arm 12 in order to reduce the difference between outputs of respective axes resistors. For the layout of the piezo resistors and metal wirings on the flexible arm described in the graph of FIG. 9, FIG. 11A illustrates the Z-axis piezo resistor 16 and the X-axis piezo resistor 14, and FIG. 11C depicts the Y-axis piezo resistor 15. Both in FIG. 11A and in FIG. 11C, the piezo resistors 14, 15 and 16 and metal lead wires 37 are arranged on the lower side of the figures with respect to the width centerline 29, but nothing is arranged on the upper side of the figures. As shown in the cross-sectional of FIG. 4C, the flexible arm has a structure in which the metal lead wire 37 is stacked on the silicon and the insulation layer 36. In other words, both in FIG. 11A and in FIG. 11C, the parts lower than the width centerline 29 in the figures have a three-layer structure consisting of the silicon, the insulation layer, and the metal lead wire 37, but the upper sides in the figures have a double-layer consisting of the silicon and the insulation layer. Such a difference in stacking structure between both sides with respect to the width centerline 29 of the flexible arm makes a subtle difference in deflectability. Rise in temperature of the sensor element generates unwanted stress in the flexible arm due to difference in thermal expansion coefficient of these composing members, increasing noise components.

Figure 11D:
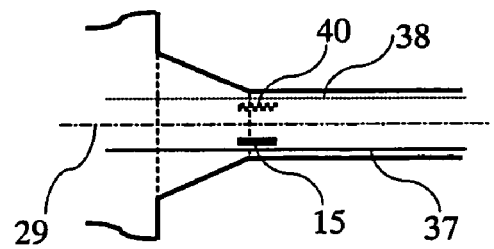
Figure 11E:
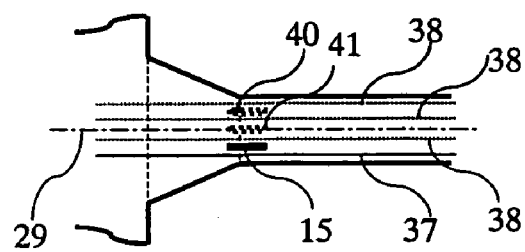

The arrangement of the piezo resistors and metal wirings on the flexible arm in FIGS. 11A and 11C described with respect to FIG. 9 has been further improved here. The improved arrangement will be stated below. FIG. 11B shows a structure in which a dummy X-axis piezo resistor 39 and two dummy metal lead wires 38 are symmetrically located with respect to the width centerline 29 to the X-axis piezo resistor 14 and the metal lead wires 37. Formation of the dummies equalizes the upper and the lower structure with each other in relation to the width centerline 29, which can suppress the generation of unwanted stress due to deflection of the flexible arm on both sides of the width centerline 29 and heat. The dummy piezo resistor includes through-holes formed in the insulation layer. For the Y-axis piezo resistor 15, as shown in FIG. 11D, a dummy Y-axis piezo resistor 40 and a dummy metal lead wire 38 are symmetrically located with respect to the width centerline 29 to the Y-axis piezo resistor 15 and the metal lead wires 37. Furthermore, as shown in FIG. 11E, a dummy Z-axis piezo resistor 41 and a dummy metal lead wires 38 may be added. FIG. 11E is substantially the same in structure as FIG. 11B. Detailed description of the effect of the dummies on output characteristics is omitted, but offset voltage and temperature characteristic of offset have been improved. In addition to improvements in output characteristics, accuracy in dimension has been improved because the symmetrical location with respect to the width centerline 29 has stabilized works on photolithography, film formation and etching.

Figure 12A:
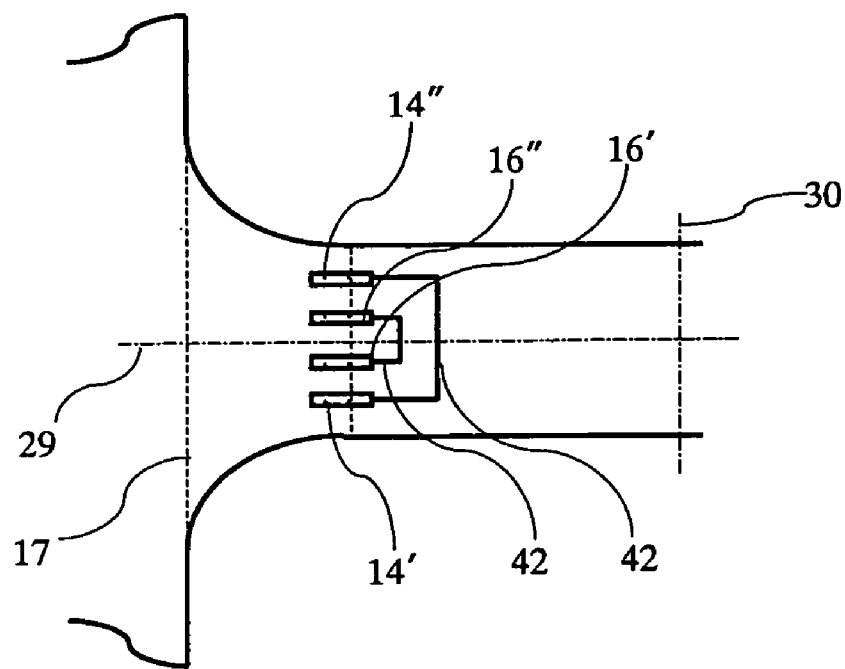
FIGS. 12A and 12B are enlarged plan views of flexible arms for explaining piezo resistor pieces divided into two and connected in series.
Figure 12B:
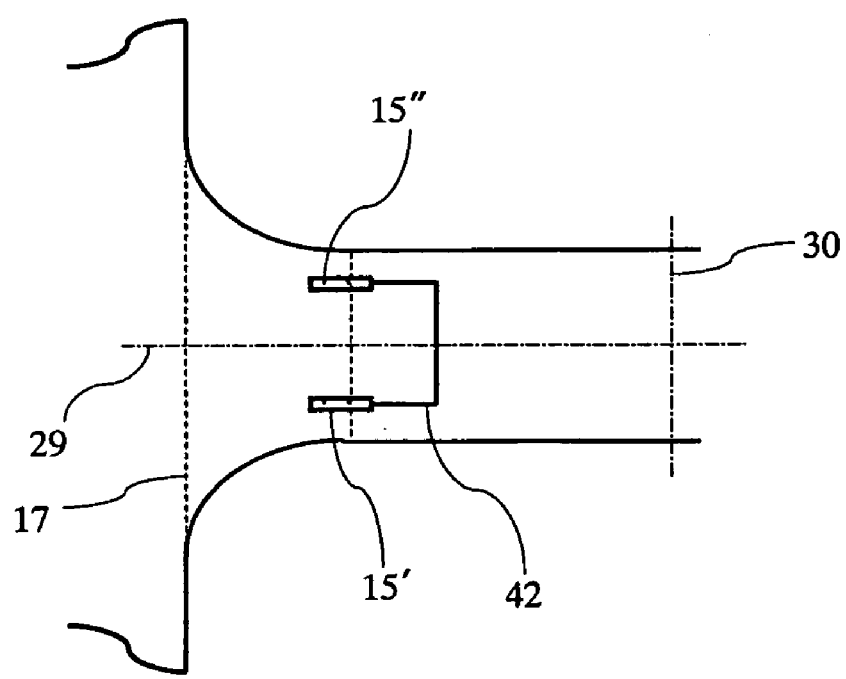

FIGS. 12A and 12B show enlarged plan views of flexible arms on which piezo resistors divided into two are arranged and connected in series as another embodiment of the present invention. FIG. 12A shows an X-axis flexible arm with X-axis and Z-axis piezo resistors, while FIG. 12B shows a Y-axis flexible arm with Y-axis piezo resistors. The 80 µm long piezo resistor used in the previous embodiments was divided into two 40 µm long piezo resistor pieces that are symmetrically located with respect to a width centerline 29. Terminals of the piezo resistor pieces on the side of the connection end 17 of the flexible arm are located at the maximum stress part, while the other terminals of the resistor pieces on the side of the length centerline 30 are connected to each other in series by a high-concentration diffusion layer 42. Z-axis piezo resistor pieces 16' and 16" are located near the width centerline 29, while X-axis and Y-axis piezo resistor pieces 14', 14", 15' and 15" are away from the width centerline 29 and symmetrically located with respect to the width centerline 29 to increase the outputs of the X-axis and the Y-axis piezo resistors.

Effects brought about by dividing, arranging, and connecting piezo resistors in series will be explained in brief below. Since the resistor is divided and divided pieces are connected in series to each other, the electric resistance of the piezo resistor does not change even after the resistor has been divided. Thus, consumption power will not increase.

Output could be increased by about 15% because terminals of the same number as divided piezo resistor pieces could be located on the maximum stress part. The symmetrical arrangement of the divided piezo resistors with respect to the width centerline 29 enables the upper and lower parts to be equal in structure about the width centerline 29, producing the same effect as is the case with the provision of dummy piezo resistors and dummy metal lead wires.

Figure 13A:
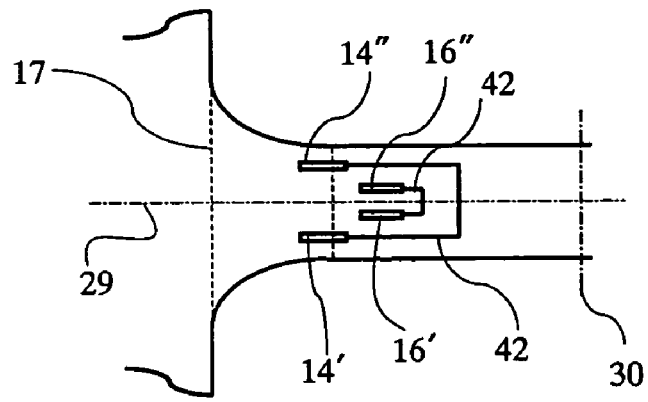
FIGS. 13A to 13C are enlarged plan views of flexible arms, explaining EXAMPLES, in which Z-axis piezo resistor pieces are shifted in the longitudinal direction of the flexible arm.
Figure 13B:
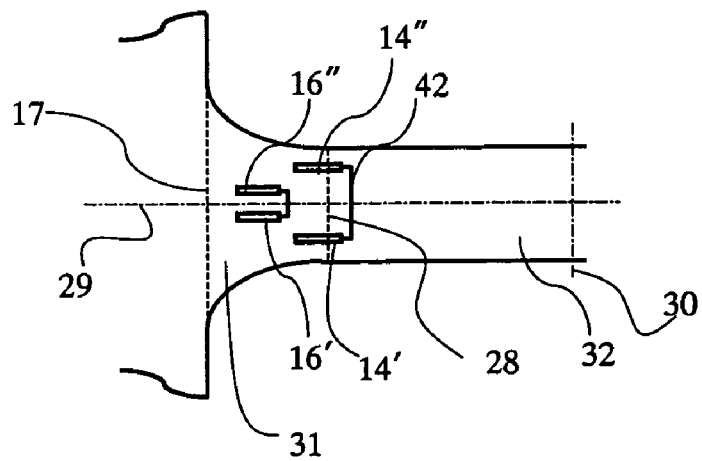
Figure 13C:
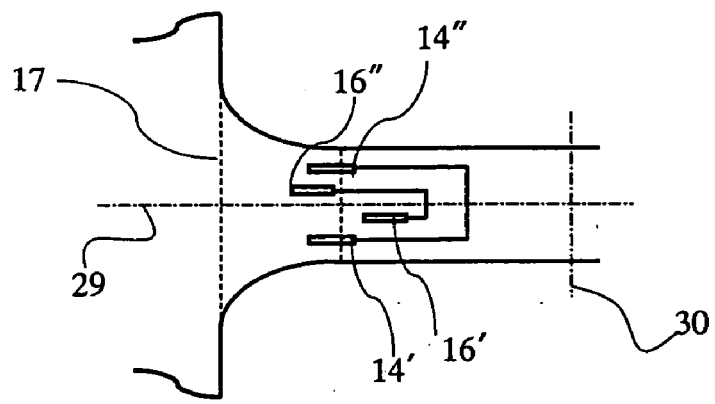
Figure 14:
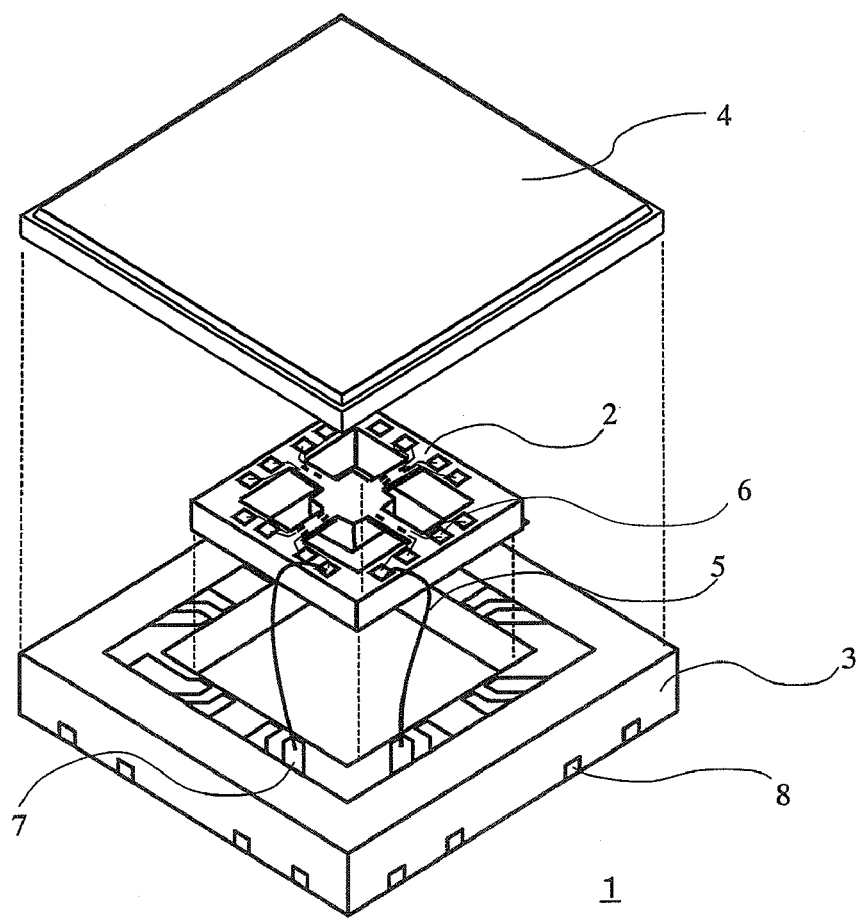
FIG. 14 is an exploded perspective view of a conventional acceleration sensor.
Figure 15A:
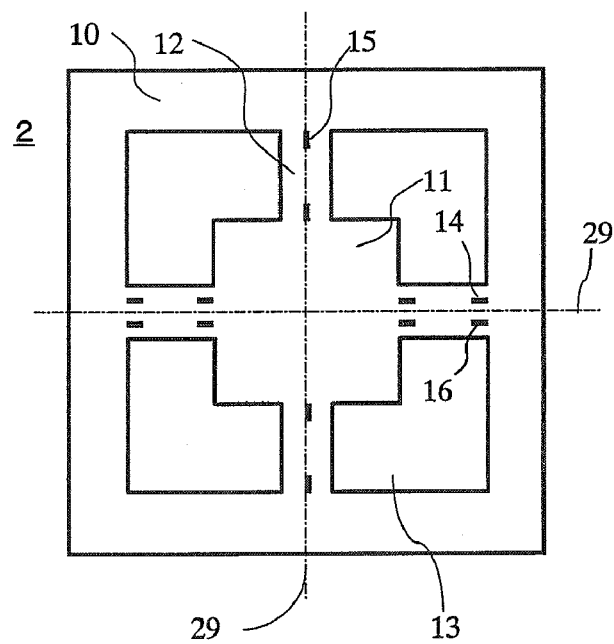
FIGS. 15A and 15B are schematic plan views of a conventional sensor element.
Figure 15B:
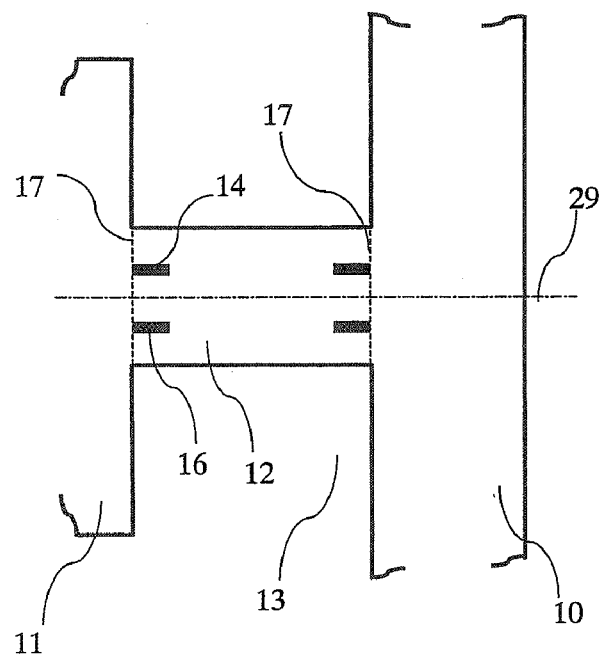
Figure 16:
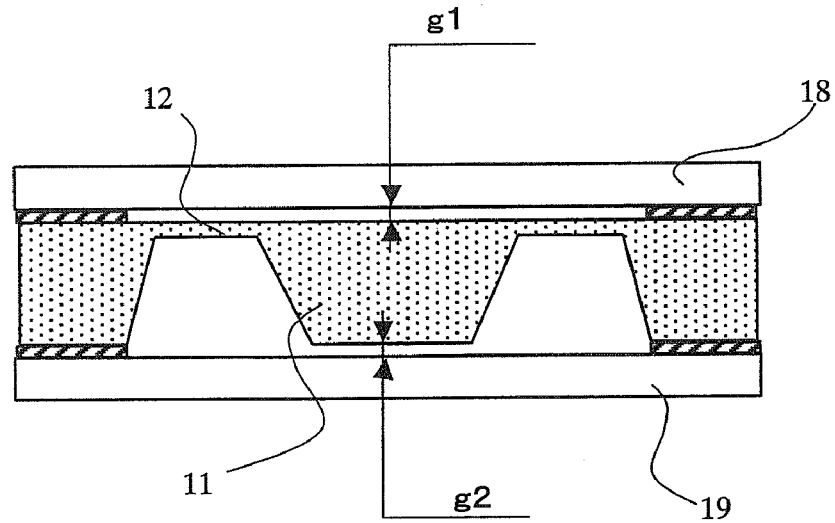
FIG. 16 is a cross-sectional view of a conventional sensor element.
Figure 17:
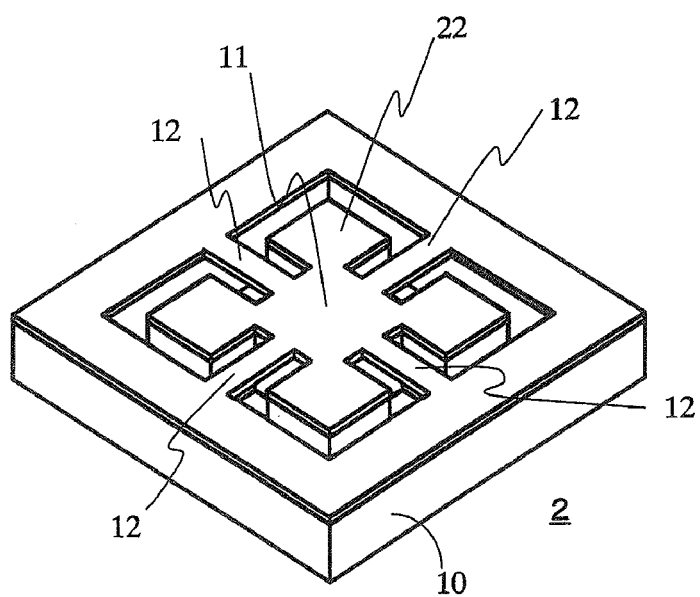
FIG. 17 is a perspective view of a conventional sensor element.
Figure 18A:
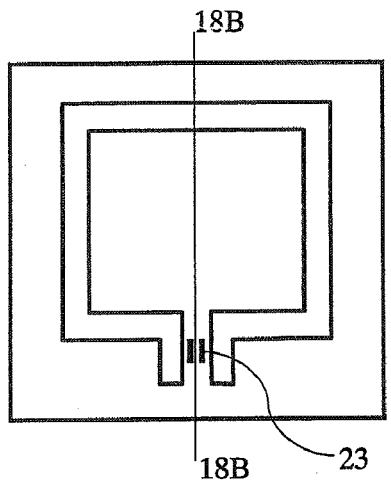
FIGS. 18A to 18C are plan views and a cross-sectional perspective view of conventional sensor elements.
Figure 18B:
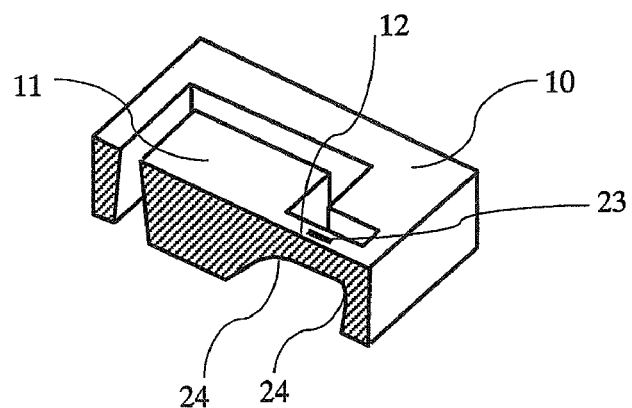
Figure 18C:
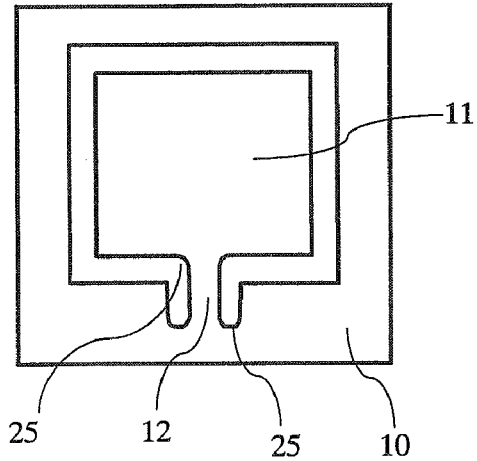
Figure 19A:
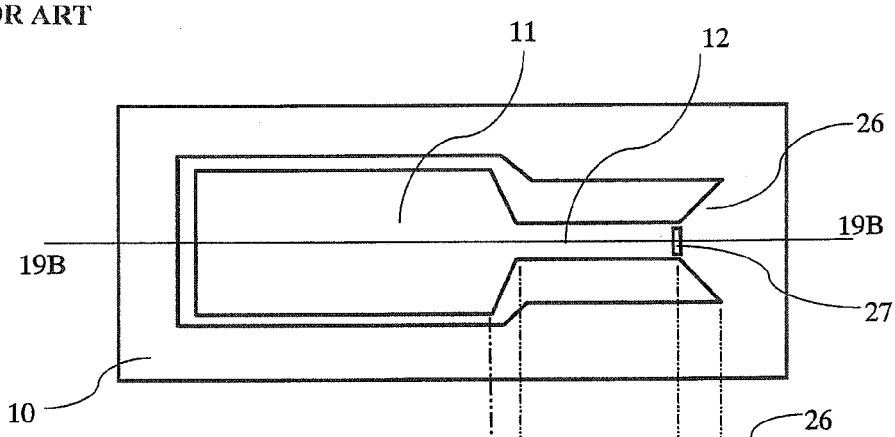
FIGS. 19A and 19B are a plan view and a cross-sectional view of a conventional sensor element.
Figure 19B:
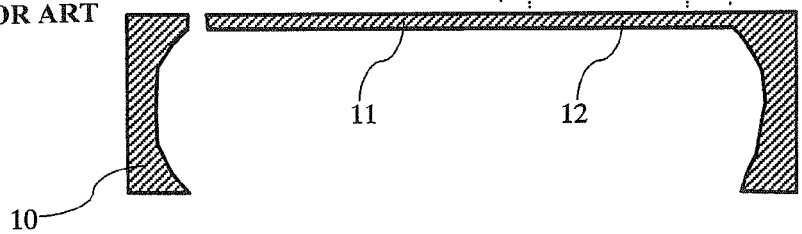
Figure 20:
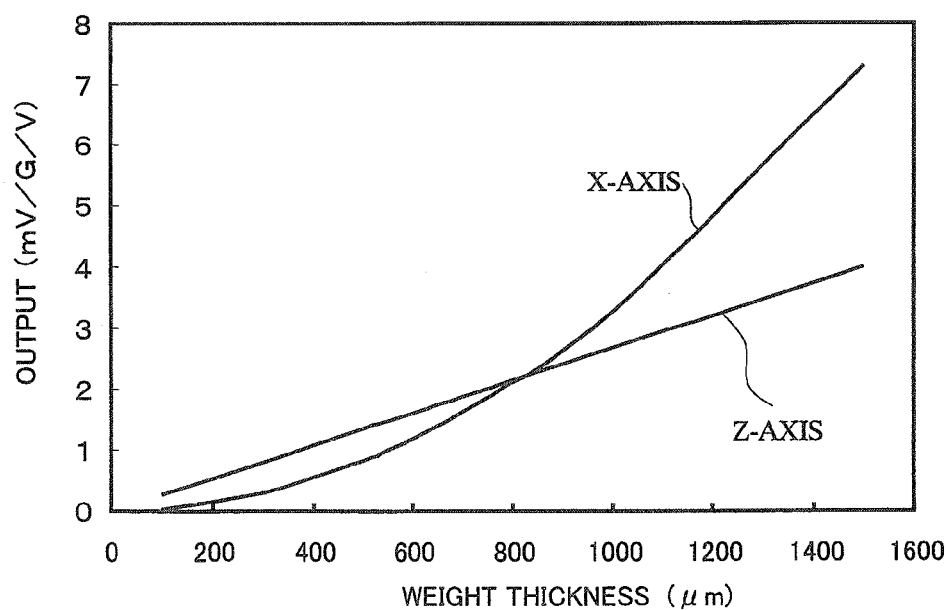
FIG. 20 is a graph explaining a relationship between an output and a weight thickness.

FIG. 13 shows examples in which piezo resistors are divided, arranged, and connected in series and Z-axis piezo resistor pieces 16' and 16" are shifted in the longitudinal direction of a flexible arm to decrease output thereof. FIG. 13A shows the Z-axis piezo resistor pieces 16' and 16" shifted toward a length centerline 30. FIG. 13B shows the Z-axis piezo resistor pieces 16' and 16" shifted toward the connection end 17 of the flexible arm. FIG. 13C shows the Z-axis piezo resistor pieces 16' and 16" located at both sides of the length centerline 30 and the connection end 17 of the flexible arm. It can be properly determined whether the piezo resistor pieces are shifted toward either the length centerline 30 or the connection end 17 of the flexible arm. The layout illustrated in FIG. 13B is preferable because a high-concentration diffusion layer 42 can be shortened which connects terminals of X-axis piezo resistor pieces 14' and 14" in series at the side of the length centerline 30.

The invention claimed is:

1. A semiconductor-type three-axis acceleration sensor comprising:
   a weight positioned in a center of the semiconductor-type three-axis acceleration sensor and being applied to by outside acceleration;
   a support frame for supporting the weight;
   at least one flexible arm, shaped in a thin beam, connecting an upper surface of the weight and an upper surface of the support frame at two first connection ends at both ends of the flexible arm between the weight and the support frame;
   a plurality of piezo resistors, for measuring each axis-component of three axis-components of the acceleration, disposed on an upper surface of the flexible arm and aligned along the upper surface of the flexible arm in a longitudinal direction of the flexible arm; and
   lead wires connecting terminals of the plurality of piezo resistors on the upper surface of the flexible arm,
   wherein the flexible arm is composed of: a flexible parallel part having a second connection end at each of both ends of the flexible parallel part and a substantially uniform width; and two flexible widening parts that connect between one of the second connection ends of the flexible parallel part and the first connection end with the support frame/the weight and are widening from the second connection ends of the flexible parallel part toward the first connection ends and have a maximum stress part of the flexible arm on the flexible widening part;
   each of the plurality of piezo resistors disposed on the upper surface of the flexible arm is positioned apart from the first connection end of the flexible arm;
   each of the plurality of piezo resistors for measuring at least one axis-component of the three axis-components of the acceleration is shifted in position in the longitudinal direction of the flexible arm from the maximum stress part on the flexible widening part; and
   each of the plurality of piezo resistors for measuring at least one of other axis-components of the three axis-components of the acceleration has a terminal of the piezo resistor positioned at the maximum stress part on the flexible widening part and extends from the maximum stress part, across the second connection end and on the flexible parallel part.

2. A semiconductor-type three-axis acceleration sensor as set forth in claim 1, wherein the plurality of piezo resistors shifted in position in the longitudinal direction of the flexible arm from the maximum stress part on the flexible widening part are those that measure an axis-component vertical to the upper surface of the weight among the three axis-components of the acceleration.

3. A semiconductor-type three-axis acceleration sensor as set forth in claim 2, wherein the flexible widening part has curved or straight ridges on both side ends of its upper surface, which are symmetric to each other with respect to a width centerline of the flexible arm.

4. A semiconductor-type three-axis acceleration sensor as set forth in claim 2, wherein the ratio W2/W1 of a width W2 of the flexible parallel part to a width W1 of the flexible arm at the first connection end of the flexible widening part is at least 0.2 and at most 0.6.

5. A semiconductor-type three-axis acceleration sensor as set forth in claim 2, wherein the ratio L2/L1 of a length L2 of the flexible parallel part to a total length L0 of the flexible arm is at least 0.4 and at most 0.9.

6. A semiconductor-type three-axis acceleration sensor as set forth in claim 2, wherein each of the plurality of piezo resistors for measuring at least one of the other axis-components of the three axis-components of the acceleration is shifted in position from a width centerline of the flexible arm to a side end of the flexible arm on the upper surface of the flexible arm.

7. A semiconductor-type three-axis acceleration sensor as set forth in claim 6, wherein each of the plurality of piezo resistors for measuring an axis-component vertical to the upper surface of the weight among the three axis-components of the acceleration is positioned on the width centerline of the flexible arm on the upper surface of the flexible arm.

8. A semiconductor-type three-axis acceleration sensor as set forth in claim 6, wherein each of the plurality of piezo resistors shifted in position from the width centerline of the flexible arm to the side end of the flexible arm on the upper surface of the flexible arm has another piezo resistor symmetrically positioned with respect to the width centerline on the upper surface of the flexible arm.

9. A semiconductor-type three-axis acceleration sensor as set forth in claim 8, wherein each of the plurality of piezo resistors for measuring an axis-component vertical to the upper surface of the weight among the three axis-components of the acceleration is positioned on the width centerline of the flexible arm on the upper surface of the flexible arm.

10. A semiconductor-type three-axis acceleration sensor as set forth in claim 8, wherein each of the plurality of piezo resistors shifted in position from the width centerline of the flexible arm to the side end of the flexible arm on the upper surface of the flexible arm and the other piezo resistor symmetrically positioned to each of the plurality of shifted piezo resistors with respect to the width centerline on the upper surface of the flexible arm are connected in series by a lead wire.

11. A semiconductor-type three-axis acceleration sensor as set forth in claim 10, wherein each of the plurality of piezo resistors shifted in position from the width centerline of the flexible arm to the side end of the flexible arm on the upper surface of the flexible arm and the other piezo resistor symmetrically positioned to each of the plurality of shifted piezo resistors with respect to the width centerline on the upper surface of the flexible arm are connected in series by a high-concentration diffusion layer between their terminals positioned on a length centerline side of the flexible arm.

12. A semiconductor-type three-axis acceleration sensor as set forth in claim 10, wherein each of the plurality of piezo resistors for measuring an axis-component vertical to the upper surface of the weight among the three axis-components of the acceleration is positioned closer to the width centerline of the flexible arm than a plurality of piezo resistors for measuring another axis-component of the three axis-components of the acceleration.

13. A semiconductor-type three-axis acceleration sensor as set forth in claim 8, wherein the other piezo resistor is a dummy element connected by a dummy lead wire.

* * * * *